United States Patent
Niikura et al.

(10) Patent No.: US 9,903,008 B2
(45) Date of Patent: Feb. 27, 2018

(54) ALUMINUM ALLOY MATERIAL, ALUMINUM ALLOY STRUCTURE, AND MANUFACTURING METHOD FOR SAME

(71) Applicant: UACJ CORPORATION, Chiyoda-Ku, Tokyo (JP)

(72) Inventors: Akio Niikura, Tokyo (JP); Kazuko Fujita, Tokyo (JP); Takashi Murase, Tokyo (JP); Yoshiyuki Oya, Tokyo (UA); Tomohito Kurosaki, Tokyo (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 15/411,739

(22) Filed: Jan. 20, 2017

(65) Prior Publication Data
US 2017/0137919 A1   May 18, 2017

Related U.S. Application Data

(63) Continuation of application No. 14/361,740, filed as application No. PCT/JP2012/075404 on Oct. 1, 2012, now Pat. No. 9,574,253.

(30) Foreign Application Priority Data

Dec. 2, 2011   (JP) ................................. 2011-264845

(51) Int. Cl.
B32B 15/01   (2006.01)
C22C 21/02   (2006.01)
(Continued)

(52) U.S. Cl.
CPC .......... *C22C 21/02* (2013.01); *B23K 20/2333* (2013.01); *F28F 1/126* (2013.01); (Continued)

(58) Field of Classification Search
None
See application file for complete search history.

(56) References Cited

U.S. PATENT DOCUMENTS

| 4,473,110 A | 9/1984 | Zawierucha |
| 6,325,870 B1 | 12/2001 | Kashiwazaki et al. |

(Continued)

FOREIGN PATENT DOCUMENTS

| EP | 1 693 475 A2 | 8/2006 |
| JP | 03-006355 A | 1/1991 |

(Continued)

OTHER PUBLICATIONS

"Aluminum Brazing Handbook (revised edition)", Japan Light Metal Welding & Construction Association, 2003, pp. 76-81, with the English translation thereof.

*Primary Examiner* — Daniel J Schleis
(74) *Attorney, Agent, or Firm* — Carrier Blackman & Associates, P.C.; Joseph P. Carrier; William D. Blackman

(57) ABSTRACT

Aluminum alloy material containing Si: 1.0 to 5.0 mass % and Fe: 0.01 to 2.0 mass % with balance being Al and inevitable impurities, wherein 250 pcs/mm$^2$ or more to 7×10$^5$ pcs/mm$^2$ or less of Si-based intermetallic compound particles having equivalent circle diameters of 0.5 to 5 μm are present in a cross-section of the aluminum alloy material, while 100 pcs/mm$^2$ or more to 7×10$^5$ pcs/mm$^2$ or less of Al-based intermetallic compound particles having equivalent circle diameters of 0.5 to 5 μm are present in a cross-section of the aluminum alloy material. An aluminum alloy structure is manufactured by bonding two or more members in vacuum or a non-oxidizing atmosphere at temperature at which a ratio of a mass of a liquid phase generated in the aluminum alloy material to a total mass of the aluminum alloy material is 5% or more and 35% or less.

2 Claims, 3 Drawing Sheets

(51) Int. Cl.
  *F28F 1/12* (2006.01)
  *F28F 21/08* (2006.01)
  *B23K 20/233* (2006.01)
  B23K 101/14 (2006.01)
  B23K 103/10 (2006.01)

(52) U.S. Cl.
  CPC ........ *F28F 21/084* (2013.01); *B23K 2201/14* (2013.01); *B23K 2203/10* (2013.01); *F28F 2275/04* (2013.01)

(56) References Cited

U.S. PATENT DOCUMENTS

| | | |
|---|---|---|
| 6,824,737 B2 | 11/2004 | Koch |
| 2005/0095167 A1 | 5/2005 | Barth et al. |
| 2007/0062618 A1 | 3/2007 | Zhao et al. |
| 2009/0078398 A1 | 3/2009 | Ueda et al. |
| 2011/0287277 A1 | 11/2011 | Kimura et al. |

FOREIGN PATENT DOCUMENTS

| | | |
|---|---|---|
| JP | 2001-262264 A | 9/2001 |
| JP | 2004-332106 A | 11/2004 |
| JP | 2008-303405 A | 12/2008 |
| JP | 2008-308760 A | 12/2008 |
| JP | 2009-068056 A | 4/2009 |
| JP | 2009-161835 A | 7/2009 |
| JP | 2010-168613 A | 8/2010 |
| JP | 2012-040611 A | 3/2012 |
| JP | 2012-051028 A | 3/2012 |

ALUMINUM ALLOY MATERIAL, ALUMINUM ALLOY STRUCTURE, AND MANUFACTURING METHOD FOR SAME

CROSS REFERENCE TO RELATED APPLICATIONS

The present application is a continuation application of U.S. Ser. No. 14/361,740, filed 30 May 2014, which is the US National Phase Application of International Application PCT/JP2012/075404, filed on 1 Oct. 2012, which claims priority from Japanese Patent Application No. 2011-264845, filed on 2 Dec. 2011. The entire subject matter of these priority documents, including specification claims and drawings thereof, is incorporated by reference herein.

TECHNICAL FIELD

The present invention relates to an aluminum alloy material, and more particularly to an aluminum alloy material capable of being bonded to another member by its own action without using a bonding material, such as a brazing filler metal or a filler metal. The present invention further relates to a structure, which employs the aluminum alloy material, which is bonded efficiently, and which is substantially free from change in size or shape between before and after the bonding, as well as to a manufacturing method of the structure.

BACKGROUND ART

When manufacturing a structure, such as a heat exchanger, which employs an aluminum alloy material as a constituent member, it is required to bond the aluminum alloy materials to each other or the aluminum alloy material to another different type of material. Various methods are known as bonding methods for the aluminum alloy material. Among the various methods, a brazing method (hard soldering method) is used in many cases. The brazing method is used in many cases in consideration of, e.g., an advantage that strong bonding can be obtained in a short time without melting a base material. As methods for manufacturing a heat exchanger, etc. by employing methods of bonding the aluminum alloy material with the brazing, there are known, for example, a method of using a brazing sheet on which a brazing filler metal made of an Al—Si alloy is clad, a method of using an extruded member coated with a powdery brazing filler metal, and a method of assembling various members and then additionally applying a brazing filler metal to portions that are to be bonded (Patent Documents 1 to 3). Moreover, "Chapter 3.2 Brazing Alloys and Brazing Sheets" in Non-Patent Document 1 explains the clad brazing sheet and the powdery brazing filler metal in detail.

Up to date, various brazing methods have been developed in the field of manufacturing of a structure using an aluminum alloy material. In relation to vehicular heat exchangers, for example, when a fin member is used in a single layer, there have been utilized a method of using a brazing sheet made of a tube material sheet on which a brazing filler metal is clad, and a method of additionally coating Si powder or a Si-containing brazing metal over the tube material sheet. On the other hand, when the tube member is used in a single layer, there has been utilized a method of using a brazing sheet made of a fin material sheet on which a brazing filler metal is clad.

Patent Document 4 discloses a method of employing a single-layer brazing sheet instead of the above-mentioned clad brazing sheet. That method proposes the use of the single-layer brazing sheet for a heat exchanger as a fin member and a tank member of the heat exchanger.

PRIOR ART DOCUMENTS

Patent Documents

Patent Document 1: JP 2008-303405 A
Patent Document 2: JP 2009-161835 A
Patent Document 3: JP 2008-308760 A
Patent Document 4: JP 2010-168613 A

Non-Patent Document

Non-Patent Document 1: "Aluminum Brazing Handbook (revised edition)", Japan Light Metal Welding & Construction Association, 2003

SUMMARY OF THE INVENTION

Problems to be Solved by the Invention

Manufacturing a clad sheet, such as a brazing sheet, requires steps of manufacturing individual layers separately, and bonding the individual layers to each other after laying them in a layered state. Thus, the use of the brazing sheet is contradictory to a demand for cost reduction of the heat exchanger, etc. Coating the powdery brazing filler metal also increases the product cost corresponding to the cost of the brazing filler metal.

Meanwhile, it is further proposed, as described above, to employ the single-layer brazing sheet instead of the brazing sheet in the form of the clad sheet. However, when the single-layer brazing sheet is used, as it is, as a tube member in manufacturing of the heat exchanger, for example, there is a problem that the tube member is greatly deformed due to heating in the manufacturing of the heat exchanger. Furthermore, when the single-layer brazing sheet is used as a fin member having a small sheet thickness, there is a problem that a fin is easily susceptible to buckling deformation.

Thus, it can be said that single-layer materials are preferably bonded to each other without using the brazing filler metal from the viewpoint of reducing the cost of the aluminum alloy structure such as the heat exchanger. However, if the single-layer brazing sheet is simply employed, it would be difficult to avoid the problem of deformation of a member. The present invention has been made in view of the background described above, and an object of the present invention is to provide a method of, when manufacturing various aluminum alloy structural bodies, not causing the problem of deformation during bonding while avoiding a cost increase attributable to the use of a multilayer member.

Means for Solving the Problems

As a result of conducting intensive studies, the inventors have found a novel bonding method, which improves the method of bonding an aluminum alloy material with the use of the known brazing method, and which utilizes a bonding ability developed by a material itself to be bonded without using a brazing filler metal. The novel bonding method is featured in that members are bonded and assembled under particular conditions by employing an aluminum alloy material described below, that the members can be bonded to each other without using a bonding material such as a brazing filler metal, and that deformation between before and after the bonding can be held very small.

Thus, the present invention provides an aluminum alloy material containing Si: 1.0 mass % to 5.0 mass % and Fe: 0.01 mass % to 2.0 mass % with balance being Al and inevitable impurities, wherein 250 pcs/mm$^2$ or more to 7×10$^5$ pcs/mm$^2$ or less of Si-based intermetallic compound particles having equivalent circle diameters of 0.5 to 5 μm are present in a cross-section of the aluminum alloy material, while 100 pcs/mm$^2$ or more to 7×10$^5$ pcs/mm$^2$ or less of dispersed particles of Al-based intermetallic compounds having equivalent circle diameters of 0.5 to 5 μm are present in a cross-section of the aluminum alloy material.

The present invention will be described in detail below. The present invention is basically featured in that a liquid phase generated when heating the aluminum alloy material having the above-mentioned composition is utilized for bonding. In view of such a basic feature, the mechanism in generation of that liquid phase will be first described.

FIG. 1 illustrates a phase diagram of an Al—Si-based alloy that is a typical binary-phase eutectic alloy. When an aluminum alloy material having a Si composition of c1 is heated, a liquid phase starts to generate at a temperature T1 near but in excess of a eutectic temperature (solidus temperature) Te. At the eutectic temperature Te or lower, as illustrated in FIG. 2 (A), dispersoids are distributed in a matrix partitioned by grain boundaries. When the liquid phase starts to generate in such a state, as illustrated in FIG. 2 (B), the grain boundaries where the dispersoids are distributed in larger amount due to segregation are melted and turn to liquid phases. Then, as illustrated in FIG. 2 (C), surroundings of dispersoid grains and intermetallic compounds of Si, which is a main additive element component dispersed into the matrix of the aluminum alloy material, are melted into spherical shapes and turn to liquid phases. Furthermore, as illustrated in FIG. 2 (D), the spherical liquid phases generated in the matrix are dissolved again into the matrix in a solid state due to interface energy with the lapse of time or a rise of temperature, and they move to the grain boundaries or surfaces through diffusion in the solid phase. Next, when the temperature rises to T2 as illustrated in FIG. 1, the amount of the liquid phases increases as seen from the phase diagram.

When, in FIG. 1, the Si composition of the aluminum alloy material is c2 that is smaller than a maximum solid-solubility limit composition, a liquid phase starts to generate at a temperature near but in excess of a solidus temperature Ts2. However, unlike the case of c1, in a structure immediately before melting, crystallized and precipitated deposits do not always exist in the matrix as illustrated in FIG. 3(A). In that case, the grain boundaries are first melted and turn to liquid phases as illustrated in FIG. 3 (B). Thereafter, as illustrated in FIG. 3(C), a liquid phase starts to generate from a place where a solute element composition is locally high in the matrix. As in the case of c1, spherical liquid phases generated in the matrix are dissolved again into the matrix in a solid state due to interface energy with the lapse of time or a rise in temperature, and they move to the grain boundaries or surfaces through diffusion in the solid phase, as illustrated in FIG. 3 (D). With the temperature rising to T3, the amount of the liquid phases increases more than that is shown in the phase diagram.

A bonding method using the aluminum alloy material, according to the present invention, utilizes the liquid phase generated with the above-described local melting inside the aluminum alloy material. By holding the mass of the liquid phase in a preferable range with adjustment of a heating temperature, the bonding and shape keeping of the fin can be both realized. For example, when structural bodies, such as a tube, a fin, and a plate, are fabricated by shaping the aluminum alloy material of the present invention and are subjected to heat treatment at temperature of about 600° C., a liquid phase is partly generated in the aluminum alloy material and bleeds to the material surface, thus enabling the aluminum alloy material to be bonded. As a result, a heat exchanger can be manufactured without using a bonding material such as a brazing filler metal.

In the aluminum alloy material according to the present invention, the unmelted matrix (i.e., a portion of the aluminum material except for intermetallic compounds) and intermetallic compounds not contributing to the generation of the liquid phase mainly develop the material strength. Therefore, although the aluminum alloy material according to the present invention comes into a state partly melted during the bonding, it can hold the strength sufficient to maintain the shape. Accordingly, the structure manufactured according to the present invention is featured in that changes in size and shape due to reduction of the strength during the bonding are hardly caused. With such a feature, the aluminum alloy material of the present invention can be preferably used as a thin material for a fin, etc., which are otherwise apt to deform during the bonding.

As described above, the present invention utilizes the liquid phase in the aluminum alloy material. According to a first aspect, the present invention is featured in that the aluminum alloy material is made of, as a basic composition, an Al—Si—Fe-based alloy containing Si at a content of 1.0 mass % to 5.0 mass % and Fe: 0.01 mass % to 2.0 mass %, and that, in a metal structure of the aluminum alloy material, Si-based intermetallic compound particles and Al-based intermetallic compound particles are present in the predetermined ranges of surface density in the cross-section of the aluminum alloy material. Those features are described below. It is to be noted that, in the following description, "mass %" is simply denoted by "%".

As for the Si composition, Si is an element that generates an Al—Si-based liquid phase and contributes to the bonding. However, if the Si composition is less than 1.0%, the liquid phase could not be generated in a sufficient amount, and bleeding of the liquid phase would be reduced, thus making the bonding imperfect. On the other hand, if the Si composition is more than 5.0%, the amount of the liquid phase generated in the aluminum alloy material would be increased, and the material strength during heating would be extremely reduced, thus causing a difficulty in maintaining the shape of the structure. For that reason, the Si composition is specified to be 1.0% to 5.0%. The Si composition is preferably 1.5% to 3.5% and more preferably 2.0% to 3.0%. The thicker a plate and the higher a heating temperature, the larger is the amount of the bleeding liquid phase. It is therefore desired that the amount of the liquid phase to bleed during the heating is set by adjusting the amount of Si and the heating temperature for the bonding, which are required depending on the structure of the structure to be manufactured.

As for the Fe composition, Fe is effective not only in increasing the strength by slightly dissolving into the matrix in a solid state, but also in preventing reduction of the strength at high temperatures, particularly, by being dispersed as crystallized deposits. If the amount of Fe added is less than 0.01%, the above-mentioned effects would be reduced, and an ingot with higher purity would have to be used, thus increasing the cost. If the amount of Fe added is more than 2.0%, coarse intermetallic compounds would be generated during casting, and manufacturability would be problematic. Moreover, when the bonded body is exposed to a corrosive environment (particularly, corrosive environment including flow of a liquid), corrosion resistance of the bonded body would be reduced. In addition, because sizes of crystal grains re-crystallized due to the heating during the bonding are reduced and grain boundary density is increased, change in size between before and after the bonding would be increased. For that reason, the amount of Fe added is specified to be 0.01% to 2.0%. A preferable amount of Fe added is 0.2% to 1.0%.

Features of a metal structure in the aluminum alloy material according to the present invention will be described below. The aluminum alloy material according to the present invention is featured in that 250 pcs/mm$^2$ or more to 7×10$^5$ pcs/mm$^2$ or less of Si-based intermetallic compound particles having equivalent circle diameters of 0.5 to 5 μm are present in a cross-section of the aluminum alloy material. Here, the term "Si-based intermetallic compound" implies (1) an intermetallic compound of Si alone, and (2) intermetallic compounds of Si and other elements, such as Ca and P, which are partly contained in Si. It is an intermetallic compound contributing to the generation of the liquid phase in the above-described light phase generation process. The term "cross-section" implies an arbitrary cross-section of the aluminum alloy material, and it may be, for example, a cross-section taken along the direction of thickness, or a cross-section taken parallel to the plate surface. From the viewpoint of simplicity in material evaluation, the cross-section taken along the direction of thickness is preferably employed.

As discussed above, the particles of the intermetallic compound, e.g., Si particles, which are dispersed in the aluminum alloy material, react with the surrounding matrix and generate a liquid phase during the bonding. Therefore, the finer the dispersed particles of the intermetallic compounds, the larger is an area where the particles and the matrix contact with each other. Thus, as the dispersed particles of the intermetallic compounds are finer, the liquid phase tends to more quickly generate during the heating for the bonding and satisfactory bonding performance are obtained. Those effects are more significant when the bonding temperature is closer to the solidus line or when the temperature rising speed is higher. In the present invention, therefore, it is required that preferable Si-based intermetallic compound particles are specified to have equivalent circle diameters of 0.5 to 5 μm, and a presence rate thereof is specified to be 250 pcs/mm$^2$ or more to 7×10$^5$ pcs/mm$^2$ or less in the cross-section of the aluminum alloy material. If the number of the Si-based intermetallic compound particles is less than 250 pcs/mm$^2$, the generated liquid phase would be segregated and satisfactory bonding would not be obtained. If the number of the Si-based intermetallic compound particles is more than 7×10$^5$ pcs/mm$^2$, the reaction area of the particles and the matrix would be too large and the amount of the liquid phase would be abruptly increased, thus making deformation more likely to occur. For that reason, the presence rate of the Si-based intermetallic compound particles is specified to be 250 pcs/mm$^2$ or more to 7×10$^5$ pcs/mm$^2$ or less. The presence rate is preferably 1×10$^3$ pcs/mm$^2$ or more to 1×10$^5$ pcs/mm$^2$ or less.

In the aluminum alloy material according to the present invention, Al-based intermetallic compounds are also present as dispersed particles in addition to the Si-based intermetallic compound particles that are generated with the basic composition (Al—Si-based alloy). The Al-based intermetallic compounds are those intermetallic compounds generated from Al and one or more additive elements and including Al—Fe-based, Al—Fe—Si-based, Al—Mn—Si-based, Al—Fe—Mn-based, and Al—Fe—Mn—Si-based compounds. These Al-based intermetallic compounds do not greatly contribute to the generation of the liquid phase unlike the Si-based intermetallic compounds, but they are dispersed particles developing the material strength together with the matrix. It is required that 100 pcs/mm$^2$ or more to 7×10$^5$ pcs/mm$^2$ or less of the Al-based intermetallic compound particles having equivalent circle diameters of 0.5 to 5 μm are present in the cross-section of the aluminum alloy material. If the number of the Al-based intermetallic compound particles is less than 100 pcs/mm$^2$, the strength would be reduced and deformation would be caused. On the other hand, if the number of the Al-based intermetallic compound particles is more than 7×10$^5$ pcs/mm$^2$, the amount of nuclei for recrystallization would be increased and crystal grains would be too finer, thus causing deformation. For that reason, the presence rate of the Al-based intermetallic compound particles is specified to be 100 pcs/mm$^2$ or more to 7×10$^5$ pcs/mm$^2$ or less. The presence rate is preferably 1×10$^3$ pcs/mm$^2$ or more to 1×10$^5$ pcs/mm$^2$ or less.

The equivalent circle diameters of the dispersed particles can be determined with SEM observation (i.e., observation of a reflected electron image by the Scanning Electron Microscope) of the cross-section. Here, the term "equivalent circle diameter" implies a nominal diameter. Preferably, the equivalent circle diameters of the dispersed particles before the bonding are determined by performing an image analysis of an SEM photo. The Si-based intermetallic compound particles and the Al-based intermetallic compound particles can be discriminated from each other based on difference of contrast with the observation by the SEM of a reflected electron image. Furthermore, the metal species of the dispersed particles can be more accurately specified by employing an EPMA (Electron Probe (X-ray) Micro Analyzer), for example.

The aluminum alloy material according to the present invention which has the features in the composition ranges of Si and Fe and in the metal structure, can realize the bonding with its own bonding performance and can be used as components of various aluminum alloy structural members.

As discussed above, in the aluminum alloy material of the present invention according to a first embodiment, Si and Fe are essential elements and their contents are specified to fulfill the basic function of developing the bonding performance. In order to not only fulfill the basic function of developing the bonding performance, but also further increase the strength, to the aluminum alloy material of the present invention according to a second embodiment, Mn, Mg and Cu are further added as essential elements in predetermined amounts in addition to Si and Fe that are added in the amounts specified above according to the first embodiment. It is to be noted that, according to the second embodiment, respective surface densities of the Si-based intermetallic compounds and the Al-based intermetallic compounds in the cross-section are specified in the same ranges as those according to the first embodiment.

Mn is an important additive element, which forms Al—Mn—Si-based intermetallic compounds together with Si, and which increases the strength by developing the action of dispersion strengthening, or by dissolving in the aluminum parent phase in a solid state and developing the action of solid-solution strengthening. If the amount of Mn added is more than 2.0%, coarse intermetallic compounds would be easily formed and corrosion resistance would be reduced. Accordingly, the amount of Mn added is specified to be 2.0% or less. A preferable amount of Mn added is 0.05% to 2.0%. In the present invention, as for not only Mn, but also other alloy components, when it is mentioned that the amount of element added is a predetermined percentage or less, the amount includes 0%.

Mg forms $Mg_2Si$ and develops age hardening after the heating for the bonding, thus increasing the strength with the age hardening. Hence Mg is an additive element to develop the effect of increasing the strength. If the amount of Mg added is more than 2.0%, Mg would react with flux and form a high-melting compound, thus significantly degrading the bonding performance. Accordingly, the amount of Mg added is specified to be 2.0% or less. A preferable amount of Mg added is 0.05% to 2.0%.

Cu is an additive element that dissolves into the matrix in a solid state and increases the strength. If the amount of Cu added is more than 1.5%, corrosion resistance would be reduced. Accordingly, the amount of Cu added is specified to be 1.5% or less. A preferable amount of Cu added is 0.05% to 1.5%.

In the present invention, as elements other than the above-mentioned essential elements, one or more of Ti, V, Cr, Ni and Zr may be selectively added to further increase the strength and the corrosion resistance. Those selective additive elements are described below.

Ti and V have the effects of not only increasing the strength by being dissolved into the matrix in a solid state, but also preventing the progress of corrosion in the direction of plate thickness by being distributed in a layered pattern. If the amount of each of Ti and V added is more than 0.3%, giant crystallized deposits would be generated, thus degrading formability and corrosion resistance. Accordingly, the amount of each of Ti and V added is specified to be preferably 0.3% or less and more preferably 0.05% to 0.3%.

Cr increases the strength with solid-solution strengthening and acts to coarsen crystal grains after the heating with precipitation of Al—Cr-based intermetallic compounds. If the amount of Cr added is more than 0.3%, coarse intermetallic compounds would be easily formed and plastic workability would be degraded. Accordingly, the amount of Cr added is specified to be preferably 0.3% or less and more preferably 0.05% to 0.3%.

Ni is crystallized or precipitated as an intermetallic compound and develops the effect of increasing the strength after the bonding with dispersion strengthening. The amount of Ni added is specified to be preferably in the range of 2.0% or less and more preferably in the range of 0.05% to 2.0%. If the Ni content is more than 2.0%, coarse intermetallic compounds would be easily formed, thus degrading workability and self-corrosion resistance.

Zr is precipitated as Al—Zr-based intermetallic compounds and develops the effect of increasing the strength after the bonding with dispersion strengthening. Moreover, the Al—Zr-based intermetallic compounds act to coarsen crystal grains during the heating. If the amount of Zr added is more than 0.3%, coarse intermetallic compounds would be easily formed and plastic workability would be degraded. Accordingly, the amount of Zr added is specified to be preferably 0.3% or less and more preferably 0.05% to 0.3%.

In addition to the above-mentioned selective additive elements mainly for increasing the strength, other selective additive elements aiming to increase corrosion resistance may also be added. The selective additive elements aiming to increase corrosion resistance are, for example, Zn, In and Sn.

Adding Zn is effective in increasing the corrosion resistance with the sacrificial anticorrosion action. Zn is substantially uniformly dissolved into the matrix in a solid state. However, when a liquid phase is generated, Zn is dissolved into the liquid phase to increase the composition of Zn in the liquid phase. Upon the liquid phase bleeding to the surface, the Zn composition in a bled region of the liquid phase rises, thus increasing the corrosion resistance due to the sacrificial anode action. Furthermore, when the aluminum alloy material of the present invention is applied to heat exchangers, the sacrificial anticorrosion action for protecting tubes, etc. against corrosion can be developed by employing the aluminum alloy material of the present invention as fins. If the amount of Zn added is more than 6.0%, the corrosion rate would be increased and self-corrosion resistance would be reduced. Accordingly, the amount of Zn added is specified to be preferably 6.0% or less and more preferably 0.05% to 6.0%.

Sn and In have the effect of developing the sacrificial anode action. If the amount of each of Sn and In added is more than 0.3%, the corrosion rate would be increased and self-corrosion resistance would be reduced. Accordingly, the amount of each of Sn and In added is specified to be preferably 0.3% or less and more preferably 0.05% to 0.3%.

In the aluminum alloy material according to the present invention, selective elements for improving characteristics of the liquid phase and further increasing the bonding performance may also be added. Those elements are preferably Be: 0.1% or less, Sr: 0.1% or less, Bi: 0.1% or less, Na: 0.1% or less, and Ca: 0.05% or less. One or two or more of those elements are added as required. More preferable ranges of those elements are Be: 0.0001% to 0.1%, Sr: 0.0001% to 0.1%, Bi: 0.0001% to 0.1%, Na: 0.0001% to 0.1%, and Ca: 0.0001% to 0.05%. Those trace elements can improve the bonding performance, for example, by causing fine dispersion of Si particles and increasing fluidity of the liquid phase. If the amount of each trace element is less than the above-mentioned more preferable specific range, the effects of causing fine dispersion of Si particles and increasing fluidity of the liquid phase would be insufficient in some cases. If the amount of each trace element is more than the above-mentioned more preferable specific range, a drawback such as reduction of the corrosion resistance would be caused in some cases. Regardless of whether any one of Be, Sr, Bi, Na and Ca is added or any two or more of those elements are added, each element is added in the above-mentioned preferable or more preferable composition range.

Fe and Mn form Al—Fe—Mn—Si-based intermetallic compounds together with Si. Because Si having formed the Al—Fe—Mn—Si-based intermetallic compounds is less effective in contributing to the generation of the liquid phase, the bonding performance reduces. Accordingly, when Fe and Mn are added to the aluminum alloy material according to the present invention, it is preferable to take care of the respective amounts of Si, Fe and Mn added. More specifically, given that the contents (mass %) of Si, Fe and Mn are denoted by S, F and M, respectively, a relational expression of $1.2 \leq S - 0.3(F+M) \leq 3.5$ is preferably satisfied. If $S-0.3(F+M)$ is less than 1.2, the bonding would be insufficient. On the other hand, if $S-0.3(F+M)$ is more than 3.5, the shape would be more apt to change between before and after the bonding.

In the aluminum alloy material generating the liquid phase, according to the present invention, a difference between the solidus temperature and the liquidus temperature is preferably 10° C. or more. The generation of the liquid phase is started upon temperature exceeding the solidus temperature. However, if the difference between the solidus temperature and the liquidus temperature is small, a temperature range in which a solid and a liquid coexist is narrow, thus causing a difficulty in controlling the amount of the liquid phase generated. Accordingly, that difference is preferably 10° C. or more. Binary alloys having compositions to satisfy the above-mentioned condition are, for example, an Al—Si-based alloy, an Al—Si—Mg-based alloy, an Al—Si—Cu-based alloy, an Al—Si—Zn-based alloy, and an Al—Si—Cu—Mg-based alloy. As the difference between the solidus temperature and the liquidus temperature increases, it is easier to make control to obtain the proper amount of the liquid phase. Accordingly, an upper limit of the difference between the solidus temperature and the liquidus temperature is not specified to particular one.

Moreover, in order to further increase corrosion resistance of the aluminum alloy material according to the present invention, a layer containing Zn as a main component may be formed on a surface of the aluminum alloy material. Zn existing in the layer formed on the surface of the aluminum alloy material is dissolved and dispersed into the alloy in a solid state during the heating for the bonding, thus forming a composition distribution that the Zn composition decreases toward the inside from the surface. Such a Zn composition distribution includes both higher and lower levels relative to the pitting potential and can greatly suppress the progress of corrosion into the aluminum alloy material due to the sacrificial anticorrosion action.

A method of forming the layer containing Zn as a main component on the surface of the aluminum alloy material can be, for example, Zn spray using pure Zn or an Al—Zn alloy, applying of Zn-replaced flux, coating of Zn powder, or Zn plating. Regardless of the type of the method, if the amount of Zn applied is too small, the sacrificial anticorrosion action would be insufficient, and if the amount of Zn applied is too large, the corrosion rate would be increased and the self-corrosion resistance would be reduced. Accordingly, the amount of Zn applied is preferably 1 to 30 g/m$^2$ and more preferably 5 to 20 g/m$^2$.

A manufacturing method for the aluminum alloy material of the present invention will be described below. The aluminum alloy material of the present invention can be manufactured by a continuous casing method, a DC (Direct Chill) casting method, or an extrusion method. The continuous casing method is not limited to particular one insofar as the method can continuously cast a plate member like a twin-roll continuous casing and rolling method or a twin-belt continuous casing method, for example. The twin-roll continuous casing and rolling method is a method of supplying molten aluminum to a gap between a pair of water-cooled rolls from a molten metal nozzle made of a refractory, thereby continuously casing and rolling a thin plate. The Hunter process, the 3C process, etc. are known as examples of the twin-roll continuous casing and rolling method. The twin-belt continuous casing method is a continuous casing method of supplying a molten metal to a gap between water-cooled rotating belts, which are positioned in a vertically opposing state, thus causing the molten metal to be solidified into a slab under cooling from belt surfaces, continuously withdrawing the slab from the opposite side of the belts to the molten-metal supplying side, and winding up the slab into a coiled form.

In the twin-roll continuous casting and rolling method, the cooling rate during the casting is as high as several times to several hundred times that in the DC casting method. For example, the cooling rate in the DC casting method is 0.5 to 20° C./sec, while the cooling rate in the twin-roll continuous casting and rolling method is 100 to 1000° C./sec. Therefore, the twin-roll continuous casting and rolling method is featured in that dispersed particles generated during the casting are more finely distributed with higher density than in the DC casting method. Those dispersed particles distributed with higher density can more easily generate a large amount of liquid phase by reacting with the matrix around the dispersed particles during the bonding. As a result, satisfactory bonding performance can be obtained.

In the case of casting using the twin-roll continuous casting and rolling method, a speed of a rolled plate is preferably 0.5 m/min or higher and 3 m/min or lower. The casting speed affects the cooling rate. If the casting speed is less than 0.5 m/min, a sufficient cooling rate would not be obtained and compounds would be coarsened. If the casting speed is more than 3 m/min, the aluminum material would not be sufficiently solidified between the rolls during the casting, and a normal plate-shaped ingot could not be obtained.

A temperature of the molten metal in the case of casting using the twin-roll continuous casting and rolling method is preferably in the range of 650 to 800° C. The temperature of the molten metal implies a temperature of a head box disposed immediately before the molten metal nozzle. If the molten metal temperature is lower than 650° C., dispersed particles of giant intermetallic compounds would be generated in the molten metal nozzle and would be mixed into the ingot, thus causing disconnection of a plate during cold rolling. If the temperature of the molten metal is higher than 800° C., the aluminum material would not be sufficiently solidified between the rolls during the casting, and a normal plate-shaped ingot could not be obtained. A more preferable temperature of the molten metal is 680 to 750° C.

Furthermore, a thickness of the cast plate is preferably 2 mm to 10 mm. In such a thickness range, a solidification rate is high even in a central portion of the plate in the direction of thickness, and a homogeneous structure can be more easily obtained. If the thickness of the cast plate is less than 2 mm, the amount of aluminum passing through a casting machine per unit time would be too small, thus causing a difficulty in stably supplying the molten metal in the direction of plate width. On the other hand, if the thickness of the cast plate is more than 10 mm, it would be difficult to wind up the cast plate with a roll. A more preferable thickness of the cast plate is 4 mm to 8 mm.

During a process of rolling the obtained cast plate into a plate having a final thickness, annealing may be carried out one or more times. As for refining, proper refining is selected depending on the use. H1n or H2n refining is usually performed to prevent erosion, but an annealed plate may be used, as it is, depending on the shape and the usage.

When the aluminum alloy material according to the present invention is manufactured by the DC casting method, it is preferable to control the casting speed of a slab or a billet during the casting. Because the casting speed affects the cooling rate, the casting speed is preferably 20 mm/min or more and 100 m/min or less. If the casting speed is less than 20 mm/min, a sufficient cooling rate would not be obtained and compounds would be coarsened. On the other hand, if the casting speed is more than 100 m/min, the aluminum material would not be sufficiently solidified during the casting, and a normal ingot could not be obtained. A more preferable casting speed is 30 mm/min or more and 80 mm/min or less.

A slab thickness in the case of employing the DC casting method is preferably 600 mm or less. If the slab thickness is more than 600 mm, a sufficient cooling rate would not be obtained and the intermetallic compounds would be coarsened. A more preferable slab thickness is 500 mm or less.

After manufacturing a slab by the DC casting method, the slab may be subjected, as required, to a homogenization process, hot rolling, cold rolling, and annealing. Refining is also performed depending on the use. H1n or H2n refining is usually performed to prevent erosion, but a soft plate may be used, as it is, depending on the shape and the usage.

When the aluminum alloy material according to the present invention is manufactured by the extrusion method, a billet is manufactured by the DC casting method, and it is then subjected, as required, to a homogenization process and hot extrusion. Refining is also performed depending on the use. The billet can be cast by the hot-top casting method or the GDC casting method.

The aluminum alloy material according to the present invention is provided in any of the forms of an expanded plate, a forged plate, a casting, etc., but the form of an expanded plate is optimum from the viewpoint of bonding performance and shape maintainability. Because the expanded plate undergoes a larger processing rate than the forged plate or the casting during the manufacturing, a state of intermetallic compounds being finely disconnected from one another is more likely to occur. Thus, the expanded plate is advantageous in that respective densities of the Si-based intermetallic compounds and the Al-based intermetallic compounds can be increased, and that satisfactory bonding performance and shape maintainability can be more easily achieved as discussed above.

A bonding method for the aluminum alloy material according to the present invention, i.e., a manufacturing method for the aluminum alloy structure, will be described below. In this description, the term "aluminum alloy structure" implies a structure in which two or more members are bonded to each other and at least one of the members constituting the structure is made of the aluminum alloy material according to the present invention. The manufacturing method for the aluminum alloy structure according to the present invention includes the steps of combining the aluminum alloy material according to the present invention, which serves as at least one bonded member of the two or more members, with other one or more bonded members, and bonding those bonded members to each other with heat treatment. In the heat treatment, the bonded members are heated for a time necessary for the bonding at temperature that is in a range of not lower than a solidus temperature and not higher than a liquidus temperature where a liquid phase is generated inside at least one bonded member of the two or more members, and that is not higher than a temperature at which the strength is reduced and the shape cannot be maintained.

The heating condition among the above-described bonding conditions for the bonding method is particularly important. As the heating condition, the bonding requires to be performed at temperature at which a ratio (hereinafter referred to as a "liquid phase ratio") of a mass of a liquid phase generated in the aluminum alloy material used as at least one bonded member of the two or more members to a total mass of the relevant aluminum alloy material is more than 0% and 35% or less. Because the bonding cannot be performed unless the liquid phase is generated, the liquid phase ratio needs to be more than 0%. However, if the amount of the liquid phase is small, the bonding is difficult to perform. For that reason, the liquid phase ratio is preferably 5% or more. If the liquid phase ratio is more than 35%, the amount of the liquid phase generated would be too large, and the aluminum alloy material would be deformed during the heating for the bonding to such a large extent as not maintaining the shape. Thus, a preferable liquid phase ratio is 5 to 30% as mentioned above. A more preferable liquid phase ratio is 10 to 20%.

In order to ensure that the liquid phase is sufficiently filled to a bonding portion, it is also preferable to take into account a time required for the filling. From that point of view, a time during which the liquid phase ratio is 5% or more is preferably specified to be 30 sec or longer and 3600 sec or shorter. More preferably, the time during which the liquid phase ratio is 5% or more is 60 sec or longer and 1800 sec or shorter. With that condition, more sufficient filling of the liquid phase is ensured, and more reliable bonding is performed. If the time during which the liquid phase ratio is 5% or more is shorter than 30 sec, the liquid phase would not be sufficiently filled to the bonding portion in some cases. On the other hand, if it is longer than 3600 sec, deformation of the aluminum material would be progressed in some cases. It is to be noted that, in the bonding method according to the present invention, since the liquid phase is moved only in the very close vicinity of the bonding portion, the time required for the filling does not depend on the size of the bonding portion.

As a practical example of the desired bonding conditions, the bonding temperature is set to be 580° C. to 620° C., and the holding time at the bonding temperature is set to be about 0 min to 10 min. Here, 0 min implies that cooling is started immediately after a member temperature has reached the predetermined bonding temperature. Moreover, in order that the metal structure of the bonding portion comes into a suitable state described later, the heating condition may be adjusted depending on the composition. The holding time is more preferably 30 sec to 5 min.

It is very difficult to measure the actual liquid phase ratio during the heating. Therefore, the liquid phase ratio specified in the present invention is usually determined based on the lever rule from an alloy composition and a maximum achievable temperature by utilizing an equilibrium diagram. In an alloy system for which an equilibrium diagram is already clarified, the liquid phase ratio can be determined based on the lever rule by utilizing that equilibrium diagram. On the other hand, regarding an alloy system for which an equilibrium diagram is not publicized, the liquid phase ratio can be determined by employing equilibrium phase-diagram calculation software. A method of determining the liquid phase ratio based on the lever rule by employing an alloy composition and a temperature is incorporated in the equilibrium phase-diagram calculation software. One example of the equilibrium phase-diagram calculation software is Thermo-Calc made by Thermo-Calc Software AB. Even for the alloy system for which the equilibrium diagram is clarified, the equilibrium phase-diagram calculation software may also be utilized for simplification because the result obtained by calculating the liquid phase ratio with the equilibrium phase-diagram calculation software is the same as that obtained by determining the liquid phase ratio based on the lever rule using the equilibrium diagram.

A heating atmosphere in the heat treatment is preferably a non-oxidizing atmosphere in which air is replaced with nitrogen or argon, for example. More satisfactory bonding performance can be obtained by employing non-corrosive flux. In addition, the bonding may be performed with heating under vacuum or reduced pressure.

The above-mentioned non-corrosive flux can be applied, for example, by a method of, after assembling the bonded members, sprinkling flux powder over them, or a method of suspending flux powder in water and spraying the suspension solution. In the case of coating the non-corrosive flux over a material plate in advance, adhesion of a coating can be increased by mixing a binder, e.g., an acrylic resin, to flux powder, and then coating the mixture. Examples of the non-corrosive flux, which is used to obtain the ordinary function of flux, include fluoride-based fluxes such as $KAlF_4$, $K_2AlF_5$, $K_2AlF_5 \cdot H_2O$, $K_3AlF_6$, $AlF_3$, $KZnF_3$, and $K_2SiF_6$, cesium-based fluxes such as $Cs_3AlF_6$, $CsAlF_4 \cdot 2H_2O$, and $Cs_2AlF_5 \cdot H_2O$, and chloride-based fluxes.

Required bonding characteristics can be obtained with the above-described control of the heat treatment and the heating atmosphere. However, when forming a comparatively fragile structure including a hollow portion, for example, if stress generated inside the structure is too high, the shape of the structure could not be maintained in some cases. In particular, when the liquid phase ratio is increased during the bonding, the shape can be satisfactorily maintained by holding the stress generated inside the structure to be comparatively small. When it is desired to take the stress inside the structure into consideration as in the above-mentioned case, very stable bonding can be obtained by satisfying a condition of $P \leq 460-12V$ where P (kPa) is a maximum value of stresses generated inside the bonded member, in which the liquid phase is generated, of the two or more members, and V (%) is the liquid phase ratio. A value denoted by the right side (460−12V) of the above expression represents threshold stress. If stress in excess of the threshold stress is exerted on the aluminum alloy material in which the liquid phase is generated, there is a possibility that large deformation may occur. When the bonded member, in which the liquid phase is generated, exists in plural number among the two or more members, the bonding is preferably performed such that $P \leq 460-12V$ is calculated using the stress P and the liquid phase ratio V for each of those plural bonded members, and all of the plural bonded members satisfy the above-mentioned expression at the same time. The stresses generated at various positions in each of the bonded members can be determined from the shape and the load. For example, those stresses can be calculated by employing, e.g., a structural calculation program.

A surface form of the bonding portion also affects the bonding performance as with pressure in the bonding portion in some cases, and more stable bonding can be obtained with both surfaces to be bonded being smooth. In the present invention, in the case of bonding two bonded members, more satisfactory bonding can be obtained when the sum of arithmetic average waviness Wa1 and Wa2, which are determined from surface unevenness of respective bonded surfaces of both the bonded members before the bonding, satisfy Wa1+Wa2≤10 (μm). The arithmetic average waviness Wa1 and Wa2 are specified in JISB0633, and are determined by setting a cutoff value such that the unevenness occurs at wavelengths of 25 to 2500 μm, and employing a waviness curve measured with a laser microscope or a confocal microscope.

In order to further increase corrosion resistance of the structure according to the present invention, the structure may be formed by spraying Zn or coating Zn-replaced flux over the surface of the aluminum alloy material according to the present invention. The corrosion resistance may be further increased by performing surface treatment, such as chromate treatment or non-chromate treatment, on the structure after the heat treatment.

The aluminum alloy structure manufactured by the above-described manufacturing method for the aluminum alloy structure has an advantage that the size and the shape of the structure are hardly changed between before and after the bonding. The reason is that, although the liquid phase is generated from the inside of the aluminum alloy material, which constitutes the bonded member, in accordance with the above-discussed mechanism, the amount of the liquid phase generated is controlled in the proper range, and hence slip deformation is hard to occur along the grain boundaries, etc. during the bonding. Another factor of providing the above-mentioned advantage resides in the effect that the shape of the bonded member can be maintained during the heating by not only the matrix, but also the intermetallic compounds not contributing to the generation of the liquid phase.

The aluminum alloy structure according to the present invention has a good feature in metal structure near the bonding portion of at least one of the bonded members. In more detail, the aluminum alloy material bonded by the method according to the present invention has a structure that many intermetallic compound particles, etc. exist at the grain boundaries. As seen from the liquid phase generation mechanism illustrated in FIGS. 2(A)-2(D), too, in a process where the liquid phase generates and flows out to the outside, the grain boundaries serve as one of flowing-out paths of the liquid phase. Therefore, liquid phases exist at the grain boundaries during the heating for the bonding. Accordingly, with subsequent cooling, the liquid phases are solidified, whereby the Si-based intermetallic compound particles and the Al-based intermetallic compound particles are generated at the grain boundaries. As a result of conducting studies, the inventors have found that, in the bonded member in which both the bonding performance and the material strength during the bonding are satisfactorily balanced, the number of triple points of grain boundaries where the Si-based intermetallic compound particles and the Al-based intermetallic compound particles, both having equivalent circle diameters of 1 μm or more, exist is 50% or more of the number of triple points of all the grain boundaries. Here, the term "triple point of grain boundaries" implies a point (triple point) at which at least three or more grain boundaries in the matrix intersect, when observing a cross-section of the aluminum alloy structure material.

The Si-based intermetallic compound particles and the Al-based intermetallic compound particles (hereinafter referred to collectively as the "intermetallic compound particles") existing at the triple points of the grain boundaries function as second-phase dispersed particles having the dispersion strengthening action, and develop the function of strengthening the member constituting the structure. Moreover, the intermetallic compounds exhibit the effect of suppressing growth of crystal grains during cooling after the heating for bonding the member. In addition, when the bonded structure is reheated, the intermetallic compounds exhibit the effect of suppressing coarsening of crystal grains in the member constituting the structure. Those effects would be insufficient if the rate of the number of triple points of the grain boundaries where the intermetallic compounds exist is less than 50%. For that reason, the number of triple points of the grain boundaries where the intermetallic compound particles having the equivalent circle diameters of 1 μm or more exist is specified to be 50% or more of the number of triple points of all the grain boundaries. That rate is preferably 80% or more. An upper limit value of that rate is 100%.

The intermetallic compounds existing at the triple points of the grain boundaries include Al-based intermetallic compound particles and Si-based intermetallic compound particles. The Si-based intermetallic compound particles are those in which Fe, Mn, etc. are dissolved in Si in a solid state. The Al-based intermetallic compound particles are those made of Al and one or more additive elements, such as Al—Fe-based, Al—Fe—Si-based, Al—Mn—Si-based, Al—Fe—Mn-based, and Al—Fe—Mn—Si-based compounds.

The presence of the intermetallic compounds existing at the triple points of the grain boundaries can be identified by several methods. With a method using an optical microscope, a cross-section of the member constituting the structure of the present invention is first mechanically ground and etched using the Keller's reagent, for example. Positions of the intermetallic compounds are then identified. Furthermore, grain boundaries in the relevant cross-section are made clear by the anodic oxidation method, and the positions of triple points of the grain boundaries are identified. By comparing both the identification results, a rate of the number of triple points of the grain boundaries where the intermetallic compound particles having the equivalent circle diameters of 1 µm or more exist is determined with respect to the number of triple points of all the grain boundaries.

When the liquid phase existing at the grain boundaries is solidified and transformed to a eutectic structure, there is a possibility that the intermetallic compounds are discontinuously formed at the grain boundaries, or that a eutectic structure is formed in which an Al phase and an intermetallic compound phase are alternately arranged. In such a case, because the grain boundaries are not clear, the grain boundaries are often observed as discontinuous lines, and the positions of the triple points of the grain boundaries are not clear. In that case, the intermetallic compounds and the eutectic structure are regarded as parts of the grain boundaries, and the triple points of the grain boundaries are determined by drawing continuous imaginary lines along the grain boundaries. When a Si phase (not illustrated) and the eutectic structure are large and the triple point of the grain boundaries is not clear as illustrated in FIG. 6, the entire area of such a portion is regarded as representing the grain boundaries as illustrated in FIG. 7. As denoted by a dotted line in FIG. 7, a region where three grain boundaries imaginarily intersect is regarded as the triple point. The triple point in the above-mentioned case is given as an area resulting from combining respective crystal grain boundary portions in a region where the three grain boundaries intersect. It is just required that the intermetallic compounds are formed even in a part of the above-mentioned triple point area.

The presence of the intermetallic compounds existing at the triple points of the grain boundaries may also be identified by a method using an EPMA (Electron Probe (X-ray) Micro Analyzer). This method is to analyze surface components of elements, such as Si and Fe, in a cross-section of the member constituting the structure by employing the EPMA. Because the Si composition is reduced near the grain boundaries, the grain boundaries can be identified. The intermetallic compounds can be identified from portions where the composition of the elements, such as Si and Fe, are high. Respective positions of the grain boundaries and the intermetallic compounds can also be identified with SEM observation (i.e., observation of a reflected electron image by the Scanning Electron Microscope) of the cross-section.

The aluminum alloy structure formed according to the present invention has a desirable feature in metal structure near the bond junction of at least one of the bonded members. In more detail, the bond junction of the aluminum alloy material according to the present invention has a metal structure that, through the liquid phase generation mechanism described above, the surroundings of Si particles are melted each in the shape of a sphere while remaining in the matrix to some extent, and that many eutectic structures, illustrated in FIGS. 2(A)-2(D), are dispersed within crystal grains of the matrix (hereinafter referred to simply as "within grains"). The inventors have found that, in the aluminum alloy structure according to the present invention in which both the bonding performance and the material strength during the bonding are satisfactorily balanced, it is preferable to have 10 to 3000 pcs/mm² of eutectic structures having a length of 3 µm or more within the grains after the bonding in terms of surface density in a cross-section of the aluminum alloy structure. With respect to the above-mentioned preferable condition of the metal structure, if the surface density of the eutectic structures within the grains is less than 10/mm², the amount of the liquid phase taking part in the bonding would be too large, thus raising a difficulty in maintaining the strength during the heating for the bonding in some cases. On the other hand, if the surface density of the eutectic structures within the grains is more than 3000/mm², the amount of the liquid phase taking part in the bonding would be too small, thus reducing the bonding performance in some cases.

Each of the above-mentioned eutectic structures within the grains often takes the shape close to a sphere since the eutectic structure is formed from the liquid phase which was generated during the heating from the melted surroundings of Si particles in the shape of a sphere and solidified during the cooling. Thus, as illustrated in FIGS. 2(A)-2(D), those eutectic structures are observed as circular eutectic structures when observed at a cross-section thereof. Moreover, when the liquid phase is generated with the Al-based intermetallic compounds serving as nuclei generation sites and remains within the grains, eutectic structures having the shapes following the Al-based intermetallic compounds may sometimes be formed.

The surface density in the cross-section of the eutectic structures within the grains can be measured by several methods. With a method using an optical microscope, a cross-section of the member constituting the structure of the present invention is mechanically ground and etched using the Keller's reagent, for example. Positions of the eutectic structures are then identified. The eutectic structures can be discriminated because the Si-based intermetallic compound phase and the Al phase are finely alternately arranged in the eutectic structures. Furthermore, the positions of the grain boundaries in the relevant cross-section are identified with the aid of the anodic oxidation method. By comparing both the identification results, the number of the eutectic structure existing within the crystal grains and having lengths of 3 µm or more is measured and converted to the surface density.

The surface density may also be measured by a method using the EPMA. This method is to analyze surface components of elements, such as Si and Fe, in a cross-section of the member constituting the structure by employing the EPMA. The eutectic structures can be identified because a portion where the Si composition is high and another portion where it is low are finely alternately arranged in the eutectic structures. Furthermore, the grain boundaries can be identified because the Si composition is reduced near the grain boundaries. The eutectic structures can also be identified with the SEM observation of the cross-section. In that case, the grain boundaries are identified by the SEM/EBSB method.

The aluminum alloy structure having the above-described metal structure is manufactured with adjustment of the size and the composition of the aluminum alloy material according to the present invention, and with adjustment of the heating condition in consideration of the composition. For example, when the thickness of the aluminum alloy material constituting the bonded member is large, or when the aluminum alloy material is arranged in a portion where the temperature during the bonding tends to be high, the liquid phase can be generated in a sufficient amount even with the use of the aluminum alloy material in which the amount of Si added is relatively low. More specifically, in the case of a fin member having a plate thickness of 30 μm to 100 μm, it is preferable that the amount of Si added is about 1.5% to 3.5% and the heating temperature is about 580° C. to 620° C. In that case, the number of the eutectic structures within the grains is 20 to 500/mm$^2$. Thus, the amount of Si added in the aluminum alloy material constituting the bonded member is previously adjusted in the range of 1.5% to 5.0% such that the surface density of the eutectic structures within the grains in the cross-section falls within the range of 10 to 3000/mm$^2$ with the observation of the structure after the bonding. As a result, a bonded body with satisfactory bonding performance can be obtained. Moreover, adding 0.3% or more of Mn is effective in reducing the eutectic structures within the grains.

As described above, the aluminum alloy structure according to the present invention is a structure constituted by two or more members, and at least one of the two or more members is made of the aluminum alloy material according to the present invention. Preferable examples of the aluminum alloy structure are various types of heat exchangers. The heat exchangers are constituted by properly combining various members, e.g., a fin member, a tube member, a plate member, and a tank member, with each other depending on intended use and conditions of use. The aluminum alloy material according to the present invention can be employed to constitute those various members of the heat exchangers.

For example, a tube member and a tank member are fabricated using the aluminum alloy material according to the present invention, and they are combined with a single-layer fin member (bare fin member). A combined assembly is subjected to the predetermined heat treatment. As a result, a heat exchanger can be manufactured in which all the members are constituted by single-layer members. A heat exchanger can also be manufactured by fabricating a fin member and a plate member using the aluminum alloy material according to the present invention, combining them with a tube member (extruded member or electrically-welded bare tube member) that does not include a brazing filler metal, and performing the predetermined heat treatment. Furthermore, a laminated type heat exchanger can be manufactured by press-forming plate members and laminating them.

In addition, the aluminum alloy material according to the present invention can also be applied to heat sinks, oil coolers having laminated structures, etc. There is a possibility that the rigidity of the above-mentioned structure using the single-layer members provided with no brazing filler metals may be reduced at high temperature in comparison with that of the structure using related-art members. In view of such a point, a structure with higher dimensional accuracy can be obtained by setting the structure with the aid of a jig, which is made of a material, e.g., iron, endurable against the high temperature, when the heat treatment is performed on the structure.

A heat exchanger can also be simply manufactured by separately fabricating an extruded member having the comblike shape and an extruded member having a hollow portion, and bonding those two extruded members to each other. Moreover, the two extruded members may be laminated to manufacture products, e.g., an oil cooler and a heat sink, having the required sizes.

Advantageous Effect of the Invention

The aluminum alloy material according to the present invention is bonded by a bonding method different from the known bonding method, e.g., the brazing method, and it can be bonded in a single-layer state to various types of bonded members. The aluminum alloy material according to the present invention hardly causes change in size or shape between before and after the bonding. The bonding method using the aluminum alloy material according to the present invention enables the bonded members to be bonded to each other without using a bonding material, such as a brazing filler metal. In addition, the aluminum alloy structure according to the present invention is able to satisfy the demand for cost reduction because of having the above-described advantages.

BRIEF DESCRIPTION OF THE INVENTION

FIG. 1 illustrates a phase diagram of an Al—Si alloy that is a binary eutectic alloy.

FIGS. 2(A)-2(D) are explanatory views to explain a liquid phase generation mechanism in an aluminum alloy material according to the present invention, which is developed with a bonding method using the aluminum alloy material.

FIGS. 3(A)-3(D) are explanatory views to explain a liquid phase generation mechanism in the aluminum alloy material according to the present invention, which is developed with the bonding method using the aluminum alloy material.

MODE FOR CARRYING OUT THE INVENTION

Figure 1:
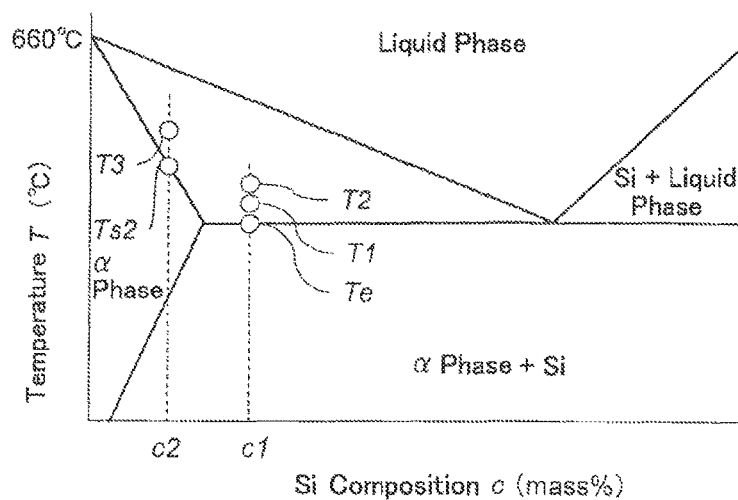
Figures 2A, 2B, 2C, 2D:
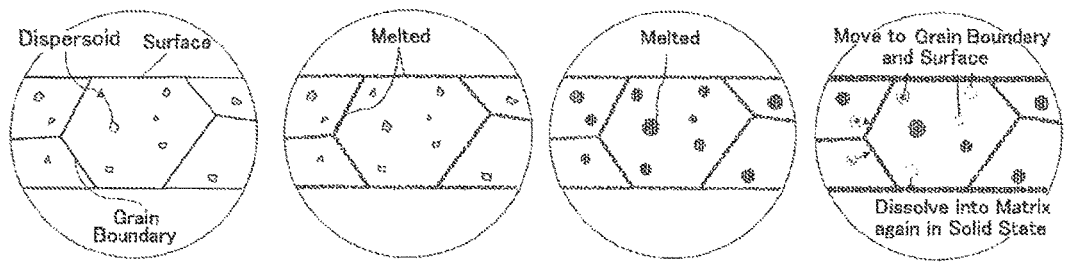
Figures 3A, 3B, 3C, 3D:
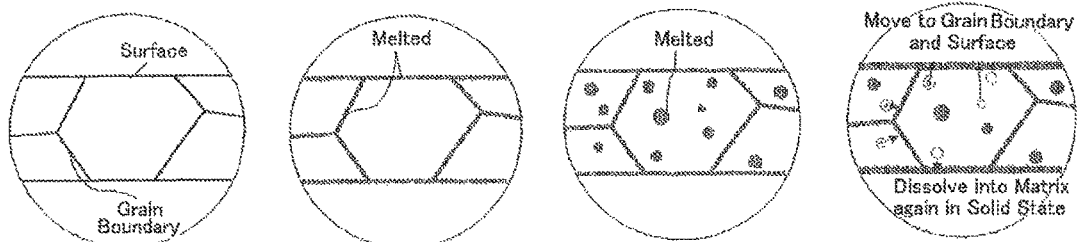

The present invention will be described in detail below in connection with Inventive Examples and Comparative Examples.

First Embodiment

Test plates made of aluminum alloy materials B1 to B59 and B77-B98 in Tables 3 to 5 were first manufactured using aluminum alloys having compositions listed in Tables 1 and 2. In the alloy compositions of Table 1, "-" represents that the content is not more than a detection limit, and "balance" includes inevitable impurities.

The test plates of B1 to B48, B52 to B57, and B84 were each cast by the twin-roll continuous casing and rolling method. The temperature of a molten metal during the casting with the twin-roll continuous casing and rolling method was 650 to 800° C., and the thickness of each cast plate was 7 mm. The casting speed was variously changed as listed in Tables 3 to 5. The obtained plate-like ingot was cold-rolled to a thickness of 0.70 mm and, after intermediate annealing of 420° C.×2 Hr, it was further cold-rolled to a thickness of 0.050 mm, whereby a sample plate was obtained. The arithmetic mean waviness Wa of the sample plate was about 0.5 μm.

The test plates of B49-B51, B58-B59, B77-B83, and B85-B98 were each cast in size of 100 mm×300 mm by the DC casting method. The casting speed was variously changed as listed in Tables 4 and 5. After facing each of cast slabs, the slab was heated and hot-rolled to a thickness of 3 mm. Then, the hot-rolled plate was cold-rolled to a thickness of 0.070 mm and, after intermediate annealing of 380° C.×2 Hr, it was further cold-rolled to a thickness of 0.050 mm, whereby a sample plate was obtained. The arithmetic mean waviness Wa of the sample plate was about 0.5 μm.

The above-mentioned test plates were evaluated for manufacturability in the manufacturing process. The manufacturability was evaluated by a method of, in manufacturing each plate or slab, rating the test plate to be ○ when the sound plate or slab was obtained without causing any problems during the manufacturing process, and rating the test plate to be x when any problem occurred during the manufacturing process, such as the occurrence of cracking during the casting, or a difficulty in continuing the rolling due to generation of giant intermetallic compounds during the casting.

The surface density of the intermetallic compounds in the manufactured plate (material plate) was measured with SEM observation (observation of a reflected electron image) of a cross-section of the plate taken in the direction of plate thickness. The Si-based intermetallic compounds and the Al-based intermetallic compounds (Al—Fe-based intermetallic compounds and etc.) were discriminated based on the difference in contrast with the SEM observation. The SEM observation was performed on five viewing fields for each sample, and the density of the dispersed particles having the equivalent circle diameters of 0.5 μm to 5 μm in the sample was measured through an image analysis of an SEM photo in each viewing field.

Tables 3 to 5 list the results of evaluating the manufacturability and measuring the dispersed particles. As listed in Tables 3 to 5, the manufacturability was good when the compositions of the aluminum alloy materials were within the ranges specified in the present invention. In the case of the alloy composition A68, because Fe exceeded the specified amount, giant intermetallic compounds were generated during the casting, and the rolling could not be continued until reaching the final plate thickness. Thus, a problem occurred in manufacturability. In the case of the alloy composition A70, because Ni exceeded the specified amount, giant intermetallic compounds were generated during the casting, and a problem occurred in manufacturability. In the case of the alloy composition A71, because Ti exceeded the specified amount, giant intermetallic compounds were generated during the casting, and the rolling could not be continued until reaching the final plate thickness. Thus, a problem occurred in manufacturability. In the cases of the alloy compositions A89-92, because Mn, V, Cr and Zr exceeded the respective specified amounts, giant intermetallic compounds were generated during the casting, and the rolling could not be continued until reaching the final plate thickness. Thus, a problem occurred in manufacturability.

Figure 4:
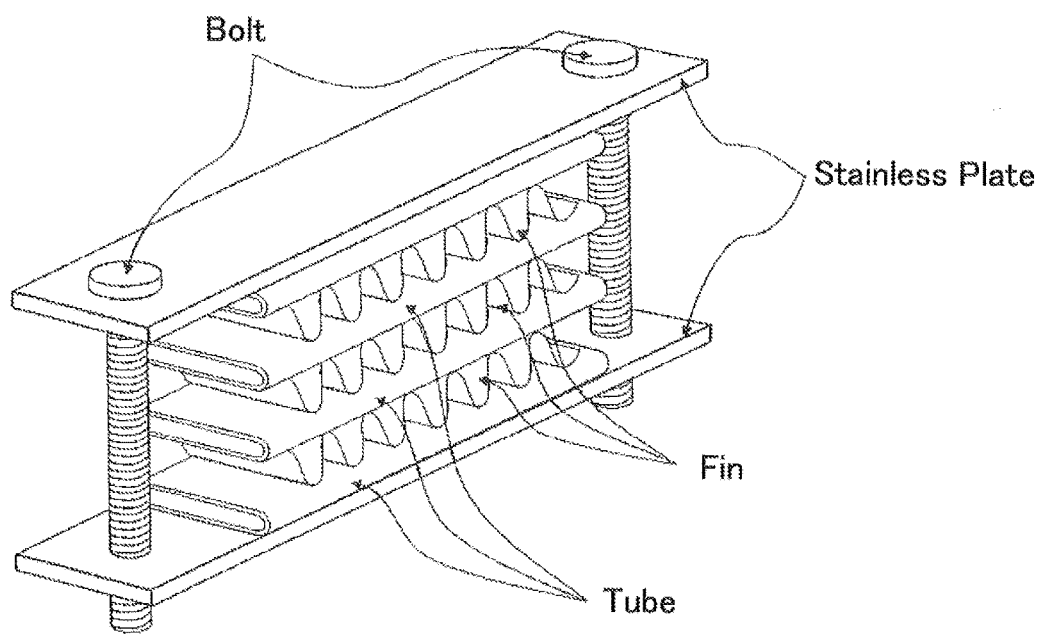
FIG. 4 is a perspective view of a three-stage laminated test piece (mini-core) used in first to third embodiments.

Next, as illustrated in FIG. 4, each test plate was formed into a fin member having a width of 16 mm, a crest height of 7 mm, and a pitch of 2.5 mm. Furthermore, a material plate having the composition b1 (Table 2) was formed into an electrically-welded tube member having an arithmetic mean waviness Wa of 0.3 μm and a plate thickness of 0.4 mm. A three-stage laminated test piece (mini-core), illustrated in FIG. 4, was fabricated by combining the obtained fin and tube members with each other, and assembling them with the aid of a stainless jig. The test pieces (mini-cores) fabricated using the fin and tube members, which are made of each of the test plates (B1-B59 and B77-B98), are listed respectively as C1-C59 and C77-C98 in Tables 3 to 5.

Next, the above-mentioned mini-cores were each dipped in a suspension solution containing 10% of non-corrosive fluoride-based flux. After drying, the mini-core was heated for 3 minutes at 580 to 600° C. in a nitrogen atmosphere, thereby bonding the fin and tube members to each other. In the case of the mini-core thus obtained, because of the difference in coefficient of thermal expansion between the stainless jig and the aluminum material, a compression load of about 4N was generated between the stainless jig and the mini-core during the heating for the bonding. This implies that, with calculation based on a bonding area, stress of about 10 kPa is generated at the bonding interface between the fin and the tube.

After bonding the fin and tube members to each other, the fin was peeled from the tube, and a bonding state was examined at 40 bonding portions between the tube and the fin, thereby determining a rate (bonding rate) of completely-bonded portions. A buckling state of the fin was also examined. The fin buckling was determined to be ⊚ when a rate of change in the fin height between before and after the bonding with respect to the fin height before the bonding was 5% or less, ○ when it was more than 5% and 10% or less, Δ when it was more than 10% and 15% or less, and x when it was more than 15%.

Furthermore, the mini-core after the bonding was embedded in a resin. After grinding, the surface density of the eutectic structures within the grains, having lengths of 3 μm or more, was measured by observing the structure in a cross-section of the member with an optical microscope. Moreover, the cross-section of the mini-core after the bonding was ground and etched using the Keller's reagent, for example, and the positions of the intermetallic compounds were identified. In addition, the grain boundaries in the relevant cross-section were made clear by the anodic oxidation method, and the positions of the triple points of the grain boundaries were identified. By comparing the positions of the intermetallic compounds and the positions of the triple points of the grain boundaries, a rate of the triple points of the grain boundaries where the intermetallic compounds existed was determined.

The evaluation results of the mini-core bonding test described above are listed in Tables 3 to 5. Tables 3 to 5 further list an equilibrium liquid phase rate at the heating temperature for each sample. The equilibrium liquid phase rate is a calculated value obtained by employing the equilibrium phase-diagram calculation software.

TABLE 1

| Composition No. | Alloy Composition (mass %) | | | | | | | | | | | | | | | |
|---|---|---|---|---|---|---|---|---|---|---|---|---|---|---|---|---|
| | Si | Fe | Cu | Mn | Mg | Zn | Ni | Ti | V | Cr | Zr | Be | Sr | Bi | Na | Ca | Al |
| A3 | 2.1 | 0.05 | — | — | — | — | — | — | — | — | — | — | — | — | — | — | balance |
| A5 | 3.4 | 0.05 | — | — | — | — | — | — | — | — | — | — | — | — | — | — | balance |
| A7 | 2.5 | 0.08 | — | — | — | — | — | — | — | — | — | — | — | — | — | — | balance |
| A8 | 2.5 | 0.12 | — | — | — | — | — | — | — | — | — | — | — | — | — | — | balance |
| A9 | 2.5 | 0.23 | — | — | — | — | — | — | — | — | — | — | — | — | — | — | balance |
| A10 | 2.5 | 0.90 | — | — | — | — | — | — | — | — | — | — | — | — | — | — | balance |
| A11 | 2.5 | 1.80 | — | — | — | — | — | — | — | — | — | — | — | — | — | — | balance |
| A25 | 2.1 | 0.12 | — | — | — | — | — | — | — | — | — | — | — | — | — | — | balance |
| A26 | 3.4 | 1.80 | — | — | — | — | — | — | — | — | — | — | — | — | — | — | balance |
| A27 | 4.8 | 0.12 | — | — | — | — | — | — | — | — | — | — | — | — | — | — | balance |
| A28 | 2.5 | 0.25 | — | 0.08 | — | — | — | — | — | — | — | — | — | — | — | — | balance |
| A29 | 2.5 | 0.25 | — | 0.12 | — | — | — | — | — | — | — | — | — | — | — | — | balance |
| A30 | 2.5 | 0.25 | — | 0.32 | — | — | — | — | — | — | — | — | — | — | — | — | balance |
| A31 | 2.5 | 0.25 | — | 1.10 | — | — | — | — | — | — | — | — | — | — | — | — | balance |
| A32 | 2.5 | 0.25 | — | 1.40 | — | — | — | — | — | — | — | — | — | — | — | — | balance |
| A33 | 2.5 | 0.25 | — | 1.90 | — | — | — | — | — | — | — | — | — | — | — | — | balance |
| A34 | 2.5 | 0.25 | 0.08 | — | — | — | — | — | — | — | — | — | — | — | — | — | balance |
| A35 | 2.5 | 0.25 | 0.12 | — | — | — | — | — | — | — | — | — | — | — | — | — | balance |
| A36 | 2.5 | 0.25 | 0.22 | — | — | — | — | — | — | — | — | — | — | — | — | — | balance |
| A37 | 2.5 | 0.25 | 0.80 | — | — | — | — | — | — | — | — | — | — | — | — | — | balance |
| A38 | 2.5 | 0.25 | 1.40 | — | — | — | — | — | — | — | — | — | — | — | — | — | balance |
| A39 | 2.5 | 0.25 | — | — | 0.05 | — | — | — | — | — | — | — | — | — | — | — | balance |
| A40 | 2.5 | 0.25 | — | — | 0.15 | — | — | — | — | — | — | — | — | — | — | — | balance |
| A41 | 2.5 | 0.25 | — | — | 0.40 | — | — | — | — | — | — | — | — | — | — | — | balance |
| A42 | 2.5 | 0.25 | — | — | 0.70 | — | — | — | — | — | — | — | — | — | — | — | balance |
| A43 | 2.5 | 0.25 | — | — | — | 0.08 | — | — | — | — | — | — | — | — | — | — | balance |
| A44 | 2.5 | 0.25 | — | — | — | 0.12 | — | — | — | — | — | — | — | — | — | — | balance |
| A45 | 2.5 | 0.25 | — | 1.10 | — | 0.50 | — | — | — | — | — | — | — | — | — | — | balance |
| A46 | 2.5 | 0.25 | — | 1.10 | — | 1.20 | — | — | — | — | — | — | — | — | — | — | balance |
| A47 | 2.5 | 0.25 | — | 1.10 | — | 2.00 | — | — | — | — | — | — | — | — | — | — | balance |
| A48 | 2.5 | 0.25 | — | 1.10 | — | 5.50 | — | — | — | — | — | — | — | — | — | — | balance |

TABLE 2

| Composition No. | Alloy Composition (mass %) | | | | | | | | | | | | | | | |
|---|---|---|---|---|---|---|---|---|---|---|---|---|---|---|---|---|
| | Si | Fe | Cu | Mn | Mg | Zn | Ni | Ti | V | Cr | Zr | Be | Sr | Bi | Na | Ca | Al |
| A50 | 2.5 | 0.25 | — | — | — | — | 0.08 | — | — | — | — | — | — | — | — | — | balance |
| A51 | 2.5 | 0.25 | — | — | — | — | 0.12 | — | — | — | — | — | — | — | — | — | balance |
| A52 | 2.5 | 0.25 | — | — | — | — | 0.23 | — | — | — | — | — | — | — | — | — | balance |
| A53 | 2.5 | 0.25 | — | — | — | — | 0.80 | — | — | — | — | — | — | — | — | — | balance |
| A54 | 2.5 | 0.25 | — | — | — | — | 1.80 | — | — | — | — | — | — | — | — | — | balance |
| A56 | 2.5 | 0.75 | — | — | — | 1.00 | — | — | — | — | — | — | — | — | — | — | balance |
| A57 | 1.5 | 0.25 | 0.30 | 0.60 | 0.12 | — | — | 0.07 | 0.07 | — | — | — | — | — | — | — | balance |
| A58 | 2.5 | 0.25 | 0.12 | 0.13 | 0.50 | — | — | — | — | — | — | — | — | — | — | — | balance |
| A59 | 2.5 | 0.25 | 1.48 | — | — | 0.50 | — | 0.28 | 0.28 | — | — | — | — | — | — | — | balance |
| A60 | 2.5 | 0.25 | — | 1.80 | — | 2.50 | — | — | — | — | — | — | — | — | — | — | balance |
| A61 | 2.5 | 0.25 | — | — | — | 1.80 | — | — | — | 0.05 | — | — | 0.01 | — | — | — | balance |
| A62 | 2.5 | 0.25 | — | — | — | 5.00 | — | — | 0.30 | — | — | — | — | — | — | — | balance |
| A63 | 2.5 | 0.25 | — | — | — | — | — | — | — | 0.30 | — | 0.01 | 0.01 | 0.01 | — | — | balance |
| A64 | 2.5 | 0.25 | — | 1.10 | — | — | — | — | — | — | 0.10 | 0.10 | 0.10 | — | 0.02 | 0.01 | balance |
| A65 | 2.5 | 0.25 | — | — | 1.80 | — | 0.10 | — | — | — | — | — | — | — | 0.001 | 0.001 | balance |
| A74 | 2.5 | 0.25 | — | — | — | — | — | — | — | 0.05 | — | — | — | — | — | — | balance |
| A75 | 2.5 | 0.25 | — | — | — | — | — | — | — | 0.07 | — | — | — | — | — | — | balance |
| A76 | 2.5 | 0.25 | — | — | — | — | — | — | — | 0.10 | — | — | — | — | — | — | balance |
| A77 | 2.5 | 0.25 | — | — | — | — | — | — | — | 0.18 | — | — | — | — | — | — | balance |
| A78 | 2.5 | 0.25 | — | — | — | — | — | — | — | 0.25 | — | — | — | — | — | — | balance |
| A79 | 2.5 | 0.25 | — | 1.10 | — | — | — | — | — | 0.15 | — | — | — | — | — | — | balance |
| A80 | 1.9 | 0.80 | — | 0.80 | — | — | — | — | — | — | — | — | — | — | — | — | balance |
| A81 | 2.5 | 0.25 | — | — | 0.20 | — | — | — | — | — | — | — | — | — | — | — | balance |
| A82 | 2.5 | 0.25 | — | — | — | — | — | 0.10 | 0.10 | — | — | — | — | — | — | — | balance |
| A83 | 2.5 | 0.25 | — | — | — | — | — | 0.15 | 0.15 | — | — | — | — | — | — | — | balance |
| A84 | 2.5 | 0.25 | — | — | — | — | — | 0.18 | 0.18 | — | — | — | — | — | — | — | balance |
| A85 | 2.5 | 0.25 | — | — | — | — | — | — | — | 0.10 | — | — | — | — | — | — | balance |
| A86 | 2.5 | 0.25 | — | — | — | — | — | — | — | 0.15 | — | — | — | — | — | — | balance |
| A87 | 2.5 | 0.25 | — | — | — | — | — | — | — | 0.18 | — | — | — | — | — | — | balance |
| A66 | 0.9 | 0.25 | — | — | — | — | — | — | — | — | — | — | — | — | — | — | balance |
| A67 | 5.3 | 0.25 | — | — | — | — | — | — | — | — | — | — | — | — | — | — | balance |
| A68 | 2.5 | 2.50 | 1.50 | — | — | — | — | — | — | — | — | — | — | — | — | — | balance |
| A69 | 2.5 | 0.25 | — | — | 2.20 | — | — | — | — | — | — | — | — | — | — | — | balance |

TABLE 2-continued

| Composition No. | Alloy Composition (mass %) | | | | | | | | | | | | | | | |
|---|---|---|---|---|---|---|---|---|---|---|---|---|---|---|---|---|
| | Si | Fe | Cu | Mn | Mg | Zn | Ni | Ti | V | Cr | Zr | Be | Sr | Bi | Na | Ca | Al |
| A70 | 2.5 | 0.25 | — | — | — | — | 2.20 | — | — | — | — | — | — | — | — | — | balance |
| A71 | 2.5 | 0.25 | — | — | — | — | — | 0.32 | — | — | — | — | — | — | — | — | balance |
| A72 | 2.5 | 0.25 | — | — | — | — | — | — | — | — | — | 0.15 | 0.15 | 0.15 | — | — | balance |
| A73 | 2.5 | 0.25 | — | — | — | — | — | — | — | — | — | — | — | — | 0.15 | 0.06 | balance |
| A88 | 2.5 | 0.005 | — | — | — | — | — | — | — | — | — | — | — | — | — | — | balance |
| A89 | 2.5 | 0.25 | — | 2.20 | — | — | — | — | — | — | — | — | — | — | — | — | balance |
| A90 | 2.5 | 0.25 | — | — | — | — | — | — | 0.33 | — | — | — | — | — | — | — | balance |
| A91 | 2.5 | 0.25 | — | — | — | — | — | — | — | 0.33 | — | — | — | — | — | — | balance |
| A92 | 2.5 | 0.25 | — | — | — | — | — | — | — | — | 0.33 | — | — | — | — | — | balance |
| b1 | 0.5 | 0.30 | 0.15 | 1.0 | — | — | — | — | — | — | — | — | — | — | — | — | balance |

TABLE 3

| | Sample No. | Material No. | Composition No. | Casting Method | Casting Speed (m/min) | (c) | (d) | (e) | Bonding Conditions Temp. (° C.) | (f) | (g) | (h) | Bonding Rate (%) | Fin Buckling |
|---|---|---|---|---|---|---|---|---|---|---|---|---|---|---|
| (a) | C1 | B1 | A3 | (b) | 1.0 | ○ | 1.3E+04 | 4.8E+03 | 600 | 12 | 2.9E+03 | 70 | 92.1 | ⊚ |
| | C2 | B2 | A5 | (b) | 1.0 | ○ | 1.7E+04 | 4.8E+03 | 600 | 27 | 1.3E+03 | 86 | 100.0 | ○ |
| | C3 | B3 | A7 | (b) | 1.0 | ○ | 1.4E+04 | 6.0E+03 | 600 | 17 | 2.0E+03 | 76 | 95.6 | ⊚ |
| | C4 | B4 | A8 | (b) | 1.1 | ○ | 1.5E+04 | 7.6E+03 | 600 | 17 | 1.8E+03 | 76 | 95.8 | ⊚ |
| | C5 | B5 | A9 | (b) | 1.0 | ○ | 1.4E+04 | 1.0E+04 | 600 | 18 | 1.3E+03 | 77 | 96.0 | ⊚ |
| | C6 | B6 | A10 | (b) | 1.0 | ○ | 1.3E+04 | 2.0E+04 | 600 | 14 | 3.7E+02 | 73 | 93.8 | ⊚ |
| | C7 | B7 | A11 | (b) | 1.0 | ○ | 1.2E+04 | 2.7E+04 | 600 | 9 | 7.6E+01 | 65 | 88.9 | ⊚ |
| | C8 | B8 | A25 | (b) | 1.0 | ○ | 1.3E+04 | 7.3E+03 | 600 | 12 | 2.6E+03 | 71 | 92.5 | ⊚ |
| | C9 | B9 | A26 | (b) | 1.5 | ○ | 2.0E+04 | 3.3E+04 | 600 | 27 | 2.4E+01 | 87 | 100.0 | ○ |
| | C10 | B10 | A27 | (b) | 1.0 | ○ | 2.2E+04 | 7.3E+03 | 580 | 31 | 9.9E+02 | 91 | 100.0 | Δ |
| | C11 | B11 | A28 | (b) | 1.0 | ○ | 1.4E+04 | 1.2E+04 | 600 | 18 | 1.1E+03 | 76 | 95.5 | ⊚ |
| | C12 | B12 | A29 | (b) | 1.0 | ○ | 1.4E+04 | 1.3E+04 | 600 | 18 | 1.0E+03 | 76 | 95.5 | ⊚ |
| | C13 | B13 | A30 | (b) | 1.0 | ○ | 1.4E+04 | 1.6E+04 | 600 | 16 | 6.7E+02 | 75 | 94.9 | ⊚ |
| | C14 | B14 | A31 | (b) | 1.0 | ○ | 1.3E+04 | 2.4E+04 | 600 | 14 | 1.3E+02 | 72 | 93.1 | ⊚ |
| | C15 | B15 | A32 | (b) | 1.0 | ○ | 1.2E+04 | 2.6E+04 | 600 | 13 | 7.1E+01 | 71 | 92.5 | ⊚ |
| | C16 | B16 | A33 | (b) | 1.0 | ○ | 1.2E+04 | 3.0E+04 | 600 | 11 | 2.6E+01 | 70 | 91.7 | ⊚ |
| | C17 | B17 | A34 | (b) | 1.0 | ○ | 1.4E+04 | 1.0E+04 | 600 | 19 | 1.2E+03 | 77 | 96.0 | ⊚ |
| | C18 | B18 | A35 | (b) | 1.0 | ○ | 1.4E+04 | 1.0E+04 | 600 | 19 | 1.2E+03 | 77 | 96.0 | ⊚ |
| | C19 | B19 | A36 | (b) | 1.0 | ○ | 1.4E+04 | 1.0E+04 | 600 | 19 | 1.2E+03 | 78 | 96.5 | ⊚ |
| | C20 | B20 | A37 | (b) | 1.0 | ○ | 1.4E+04 | 1.0E+04 | 600 | 23 | 1.0E+03 | 80 | 98.0 | ○ |
| | C21 | B21 | A38 | (b) | 1.0 | ○ | 1.4E+04 | 1.0E+04 | 600 | 26 | 8.9E+02 | 83 | 99.5 | ○ |
| | C22 | B22 | A39 | (b) | 1.0 | ○ | 1.4E+04 | 1.0E+04 | 600 | 19 | 1.2E+03 | 77 | 96.0 | ⊚ |
| | C23 | B23 | A40 | (b) | 1.0 | ○ | 1.4E+04 | 1.0E+04 | 600 | 19 | 1.2E+03 | 78 | 96.5 | ⊚ |
| | C24 | B24 | A41 | (b) | 1.0 | ○ | 1.4E+04 | 1.0E+04 | 600 | 21 | 1.1E+03 | 78 | 97.0 | ○ |
| | C25 | B25 | A42 | (b) | 1.0 | ○ | 1.4E+04 | 1.0E+04 | 600 | 23 | 1.0E+03 | 80 | 98.0 | ○ |
| | C26 | B26 | A43 | (b) | 1.0 | ○ | 1.4E+04 | 1.0E+04 | 600 | 18 | 1.3E+03 | 77 | 96.0 | ⊚ |
| | C27 | B27 | A44 | (b) | 1.0 | ○ | 1.4E+04 | 1.0E+04 | 600 | 18 | 1.3E+03 | 77 | 96.0 | ⊚ |
| | C28 | B28 | A45 | (b) | 1.0 | ○ | 1.3E+04 | 2.4E+04 | 600 | 15 | 1.2E+02 | 73 | 93.6 | ⊚ |
| | C29 | B29 | A46 | (b) | 1.0 | ○ | 1.3E+04 | 2.4E+04 | 600 | 16 | 1.1E+02 | 74 | 94.1 | ⊚ |
| | C30 | B30 | A47 | (b) | 1.0 | ○ | 1.3E+04 | 2.4E+04 | 600 | 17 | 1.0E+02 | 75 | 95.1 | ⊚ |
| | C31 | B31 | A48 | (b) | 1.0 | ○ | 1.3E+04 | 2.4E+04 | 600 | 26 | 7.2E+01 | 82 | 99.1 | ○ |

(a) Inventive Example
(b) Continuous casting
(c) Manufacturability
(d) Surface Density of Si-based Intermetallic Compounds (number/mm$^2$)
(e) Surface Density of Al-based Intermetallic Compounds (number/mm$^2$)
(f) Equilibrium Liquid Phase Rate (%)
(g) Surface Density of Eutectic Structures (number/mm$^2$)
(h) Rate of Triple Points of Grain boundaries where Intermetallic Compounds Exist (%)
E+ in Table indicates exponential notation. For example, 1.3+04 implies $1.3 \times 10^4$.

TABLE 4

| | Sample No. | Material No. | Composition No. | Casting Method | Casting Speed (m/min) | (c) | (d) | (e) | Bonding Conditions Temp. (° C.) | (f) | (g) | (h) | Bonding Rate (%) | Fin Buckling |
|---|---|---|---|---|---|---|---|---|---|---|---|---|---|---|
| (a) | C33 | B33 | A50 | (b) | 1.0 | ○ | 1.4E+04 | 1.0E+04 | 600 | 19 | 1.2E+03 | 77 | 96.0 | ⊚ |
| | C34 | B34 | A51 | (b) | 1.0 | ○ | 1.4E+04 | 1.0E+04 | 600 | 19 | 1.2E+03 | 77 | 96.0 | ⊚ |

TABLE 4-continued

| Sample No. | Material No. | Composition No. | Casting Method | Casting Speed (m/min) | (c) | (d) | (e) | Bonding Conditions Temp. (° C.) | (f) | (g) | (h) | Bonding Rate (%) | Fin Buckling |
|---|---|---|---|---|---|---|---|---|---|---|---|---|---|
| C35 | B35 | A52 | (b) | 1.0 | ○ | 1.4E+04 | 1.0E+04 | 600 | 20 | 1.2E+03 | 78 | 96.5 | ◎ |
| C36 | B36 | A53 | (b) | 1.0 | ○ | 1.4E+04 | 1.0E+04 | 600 | 23 | 1.0E+03 | 80 | 98.0 | ○ |
| C37 | B37 | A54 | (b) | 1.0 | ○ | 1.4E+04 | 1.0E+04 | 600 | 27 | 8.7E+02 | 83 | 100.0 | ○ |
| C39 | B39 | A56 | (b) | 1.0 | ○ | 1.4E+04 | 1.8E+04 | 600 | 17 | 4.3E+02 | 75 | 94.8 | ◎ |
| C40 | B40 | A57 | (b) | 0.8 | ○ | 8.0E+03 | 1.7E+04 | 600 | 18 | 3.2E+02 | 72 | 93.0 | ◎ |
| C41 | B41 | A58 | (b) | 0.8 | ○ | 1.2E+04 | 1.1E+04 | 600 | 21 | 8.0E+02 | 78 | 96.8 | ○ |
| C42 | B42 | A59 | (b) | 0.8 | ○ | 1.2E+04 | 9.4E+03 | 600 | 27 | 8.4E+02 | 83 | 99.9 | ○ |
| C43 | B43 | A60 | (b) | 0.8 | ○ | 1.0E+04 | 2.6E+04 | 600 | 16 | 2.3E+01 | 72 | 93.2 | ◎ |
| C44 | B44 | A61 | (b) | 1.2 | ○ | 1.6E+04 | 1.1E+04 | 600 | 27 | 8.7E+02 | 84 | 100.0 | ○ |
| C45 | B45 | A62 | (b) | 0.6 | ○ | 1.0E+04 | 8.1E+03 | 600 | 29 | 8.0E+02 | 83 | 99.6 | ○ |
| C46 | B46 | A63 | (b) | 0.6 | ○ | 1.0E+04 | 8.1E+03 | 600 | 17 | 1.4E+03 | 73 | 93.6 | ◎ |
| C47 | B47 | A64 | (b) | 0.6 | ○ | 9.3E+03 | 1.9E+04 | 600 | 14 | 1.3E+02 | 70 | 91.7 | ◎ |
| C48 | B48 | A65 | (b) | 0.6 | ○ | 1.0E+04 | 8.1E+03 | 600 | 30 | 7.7E+02 | 84 | 100.0 | ○ |
| C49 | B49 | A25 | DC casting | 0.03 | ○ | 1.3E+03 | 1.3E+03 | 600 | 12 | 2.6E+03 | 55 | 82.8 | ◎ |
| C50 | B50 | A60 | DC casting | 0.04 | ○ | 1.5E+03 | 6.1E+03 | 600 | 16 | 2.3E+01 | 58 | 84.8 | ◎ |
| C51 | B51 | A64 | DC casting | 0.03 | ○ | 1.4E+03 | 4.3E+03 | 600 | 14 | 1.3E+02 | 56 | 83.3 | ◎ |
| C77 | B77 | A74 | DC casting | 0.03 | ○ | 1.5E+03 | 1.9E+03 | 600 | 17 | 1.4E+03 | 60 | 85.7 | ◎ |
| C78 | B78 | A75 | DC casting | 0.03 | ○ | 1.5E+03 | 1.9E+03 | 600 | 17 | 1.4E+03 | 60 | 85.7 | ◎ |
| C79 | B79 | A76 | DC casting | 0.03 | ○ | 1.5E+03 | 1.9E+03 | 600 | 16 | 1.4E+03 | 59 | 85.2 | ◎ |
| C80 | B80 | A77 | DC casting | 0.03 | ○ | 1.5E+03 | 1.9E+03 | 600 | 17 | 1.4E+03 | 60 | 85.7 | ◎ |
| C81 | B81 | A78 | DC casting | 0.03 | ○ | 1.5E+03 | 1.9E+03 | 600 | 16 | 1.4E+03 | 59 | 85.2 | ◎ |
| C82 | B82 | A79 | DC casting | 0.03 | ○ | 1.4E+03 | 4.3E+03 | 600 | 17 | 1.1E+02 | 59 | 85.3 | ◎ |
| C83 | B83 | A80 | DC casting | 0.05 | ○ | 1.5E+03 | 6.7E+03 | 610 | 10 | 4.1E+01 | 54 | 82.2 | ◎ |
| C84 | B84 | A80 | (b) | 1 | ○ | 1.0E+04 | 2.9E+04 | 610 | 10 | 4.1E+01 | 68 | 90.5 | ◎ |
| C85 | B85 | A81 | DC casting | 0.03 | ○ | 1.5E+03 | 1.9E+03 | 600 | 19 | 1.2E+03 | 61 | 86.7 | ◎ |
| C86 | B86 | A82 | DC casting | 0.03 | ○ | 1.5E+03 | 1.9E+03 | 600 | 17 | 1.4E+03 | 60 | 85.7 | ◎ |
| C87 | B87 | A83 | DC casting | 0.03 | ○ | 1.5E+03 | 1.9E+03 | 600 | 17 | 1.4E+03 | 60 | 85.7 | ◎ |
| C88 | B88 | A84 | DC casting | 0.03 | ○ | 1.5E+03 | 1.9E+03 | 600 | 17 | 1.4E+03 | 60 | 85.7 | ◎ |
| C89 | B89 | A85 | DC casting | 0.03 | ○ | 1.5E+03 | 1.9E+03 | 600 | 17 | 1.4E+03 | 60 | 85.7 | ◎ |
| C90 | B90 | A86 | DC casting | 0.03 | ○ | 1.5E+03 | 1.9E+03 | 600 | 17 | 1.4E+03 | 60 | 85.7 | ◎ |
| C91 | B91 | A87 | DC casting | 0.03 | ○ | 1.5E+03 | 1.9E+03 | 600 | 17 | 1.4E+03 | 60 | 85.7 | ◎ |

(a) Inventive Example
(b) Continuous casting
(c) Manufacturability
(d) Surface Density of Si-based Intermetallic Compounds (number/mm$^2$)
(e) Surface Density of Al-based Intermetallic Compounds (number/mm$^2$)
(f) Equilibrium Liquid Phase Rate (%)
(g) Surface Density of Eutectic Structures (number/mm$^2$)
(h) Rate of Triple Points of Grain boundaries where Intermetallic Compounds Exist (%)
E+ in Table indicates exponential notation. For example, 1.3+04 implies $1.3 \times 10^4$.

TABLE 5

| | Sample No. | Material No. | Composition No. | Casting Method | Casting Speed (m/min) | (c) | (d) | (e) | Bonding Conditions Temp. (° C.) | (f) | (g) | (h) | Bonding Rate (%) | Fin Buckling |
|---|---|---|---|---|---|---|---|---|---|---|---|---|---|---|
| (i) | C52 | B52 | A66 | (b) | 1.0 | ○ | 7.1E+03 | 1.0E+04 | 620 | 4 | 5.8E+03 | 48 | 73.4 | — |
| | C53 | B53 | A67 | (b) | 1.0 | ○ | 2.3E+04 | 1.0E+04 | 580 | 36 | 6.3E+02 | 95 | 100.0 | X |
| | C54 | B54 | A68 | (b) | 1.0 | X | 8.5E+03 | 4.4E+04 | — | — | — | — | — | — |
| | C55 | B55 | A69 | (b) | 1.0 | ○ | 1.4E+04 | 1.0E+04 | 600 | 32 | 7.3E+02 | 88 | 30.0 | Δ |
| | C56 | B56 | A70 | (b) | 1.0 | X | 1.4E+04 | 1.0E+04 | — | — | — | — | — | — |
| | C57 | B57 | A71 | (b) | 0.2 | X | 5.0E+03 | 4.8E+03 | — | — | — | — | — | — |
| | C58 | B58 | A72 | DC Casting | 0.3 | ○ | 6.5E+03 | 5.8E+03 | 600 | 18 | 1.3E+03 | 71 | 58.5 | ◎ |
| | C59 | B59 | A73 | DC Casting | 0.3 | ○ | 6.5E+03 | 5.8E+03 | 600 | 18 | 1.3E+03 | 71 | 57.7 | ◎ |
| | C93 | B93 | A88 | DC Casting | 0.003 | ○ | 3.5E+02 | 9.0E+01 | 600 | 17 | 2.4E+03 | 49 | 79.4 | X |
| | C94 | B94 | A80 | DC Casting | 0.003 | ○ | 2.4E+02 | 1.7E+03 | 610 | 10 | 4.1E+01 | 41 | 74.4 | ◎ |
| | C95 | B95 | A89 | DC Casting | 1.0 | X | 2.6E+03 | 1.0E+04 | — | — | — | — | — | — |
| | C96 | B96 | A90 | DC Casting | 1.0 | X | 3.2E+03 | 3.4E+03 | — | — | — | — | — | — |
| | C97 | B97 | A91 | DC Casting | 1.0 | X | 3.2E+03 | 3.4E+03 | — | — | — | — | — | — |
| | C98 | B98 | A92 | DC Casting | 1.0 | X | 3.2E+03 | 3.4E+03 | — | — | — | — | — | — |

(i) Comparative Example
(b) Continuous casting
(c) Manufacturability
(d) Surface Density of Si-based Intermetallic Compounds (number/mm$^2$)
(e) Surface Density of Al-based Intermetallic Compounds (number/mm$^2$)
(f) Equilibrium Liquid Phase Rate (%)
(g) Surface Density of Eutectic Structures (number/mm$^2$)
(h) Rate of Triple Points of Grain boundaries where Intermetallic Compounds Exist (%)
E+ in Table indicates exponential notation. For example, 1.3+04 implies $1.3 \times 10^4$.

As seen from comparing the evaluation results of the individual mini-core samples, listed in Tables 3 to 5, with the compositions (Tables 1 and 2) of the aluminum alloy materials of the fin members, the bonding rate and the fin buckling were both acceptable in the samples (C1-C51 and C77-C98), which satisfied the conditions specified in the present invention with regard to the composition of the aluminum alloy material and the heating condition.

On the other hand, in Comparative Example C52 (alloy composition A66), because the Si component did not reach the specified amount, the liquid phase rate (equilibrium liquid phase rate) was as low as less than 5%, and the rate of the triple points of the grain boundaries where the intermetallic compounds existed was also low. As a result, the bonding rate was reduced, and the fin buckling could not be measured.

In Comparative Example C53 (alloy composition A67), because the Si component exceeded the specified amount, the liquid phase rate was high during the bonding, and the fin was collapsed and buckled.

In Comparative Example C54 (alloy composition A68), as described above, because the Fe component exceeded the specified amount, giant intermetallic compounds were generated, and the rolling could not be continued until reaching the final plate thickness. Thus, a problem occurred in manufacturability.

In Comparative Example C55 (alloy composition A69), because Mg exceeded the specified amount, the bonding rate was as low as 30%, and the bonding was uncompleted.

In Comparative Example C56 (alloy composition A70), as described above, a problem occurred in manufacturability. In Comparative Example C57 (alloy composition A71), as described above, giant intermetallic compounds were generated during the casting, and the rolling could not be continued until reaching the final plate thickness. Thus, a problem occurred in manufacturability.

In Comparative Example C58 (alloy composition A72), because Be, Sr and Bi exceeded the respective specified amounts, an oxide film on the surface was thickened, and the bonding rate was reduced.

In Comparative Example C59 (alloy composition A73), because Na and Ca exceeded the respective specified amounts, an oxide film on the surface was thickened, and the bonding rate was reduced.

In Comparative Example C93 (alloy composition A88), because the Fe component was less than the specified amount, the surface density of the Al-based intermetallic compounds in the alloy was reduced, and the rate of the triple points of the grain boundaries where the intermetallic compounds existed was also low. As a result, the bonding rate was reduced, and the fin buckling occurred.

In Comparative Example C94 (alloy composition A80), although the alloy composition was within the specified range, the surface density of the Si-based intermetallic compounds was reduced, and the rate of the triple points of the grain boundaries where the intermetallic compounds existed was also low. As a result, the bonding rate was reduced.

In Comparative Examples C95-98 (alloy compositions A89-92), as described above, giant intermetallic compounds were generated during the casting, and the rolling could not be continued until reaching the final plate thickness. Thus, a problem occurred in manufacturability.

Second Embodiment

In a second embodiment, influences of the heating temperature as one of the bonding conditions were examined.

The material plates manufactured in the first embodiment were optionally selected as listed in Table 6 and were formed into fin members similar to those in the first embodiment. Furthermore, as in the first embodiment, three-stage laminated test pieces (mini-cores) were fabricated (FIG. 4). The mini-cores were each dipped in a suspension solution containing 10% of non-corrosive fluoride-based flux. After drying, the mini-cores were heated and held for predetermined times at various heating temperatures, listed in Table 6, in a nitrogen atmosphere, thereby bonding the fin and tube members to each other.

For each of the mini-cores thus bonded, the bonding rate was measured and evaluated in the same way as in the first embodiment. Furthermore, the fin height of the mini-core after the bonding was measured, and a change rate of the size after the bonding with respect to that before the bonding was determined as a deformation rate. The evaluation result was determined to be ⊚ when the deformation rate was 3% or less, ○ when it was more than 3% and 5% or less, Δ when it was more than 5% and 8% or less, and x when it was more than 8%. In addition, as in the first embodiment, the structure in a cross-section of each member was observed to determine the surface density of the intermetallic compounds, the surface density of the eutectic structures having lengths of 3 μm or more within the grains, and the rate of the triple points of the grain boundaries where the intermetallic compounds having the equivalent circle diameters of 1 μm or more existed with respect to the triple points of all the grain boundaries. The evaluation results are listed in Table 6.

increased. In Comparative Example C75, the liquid phase rate was too low. Furthermore, the rate of the triple points of the grain boundaries where the intermetallic compounds having the equivalent circle diameters of 1 μm or more existed was also low. As a result, the bonding rare was reduced.

Third Embodiment

In a third embodiment, the effect of the layer containing Zn as a main component, aiming to improve extrusion formability and corrosion resistance, was examined. First, materials having compositions (No. E1-E24, E25 and E26), listed in Table 7, were DC-cast, and billets each having ϕ 150 mm were obtained. In the alloy compositions of Table 7, "-" represents that the content is not more than a detection limit, and "balance" includes inevitable impurities.

Figure 5:
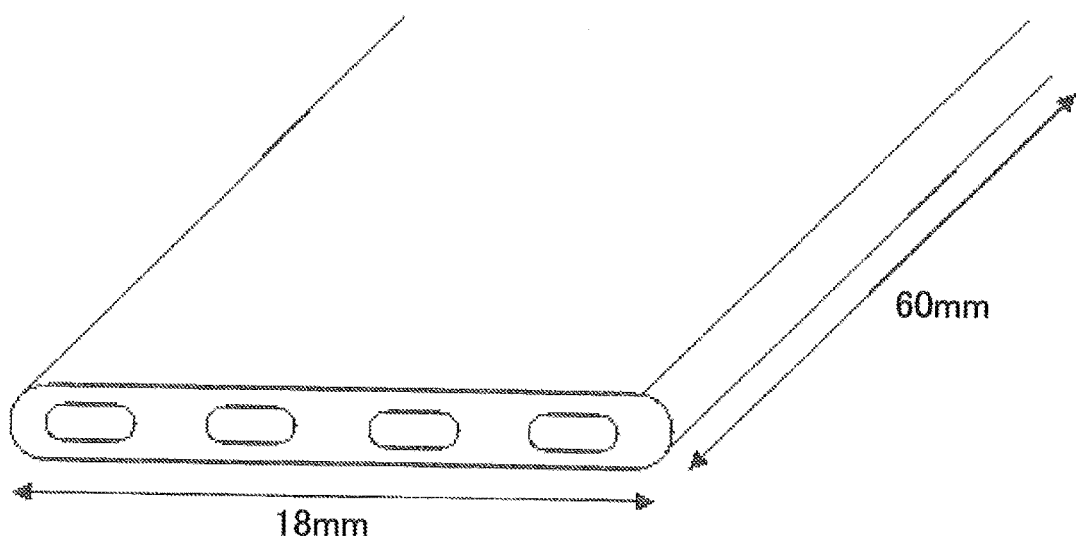
FIG. 5 is a perspective view illustrating a part of the shape of an extruded tube used in a test piece in the third embodiment.
Figure 6:
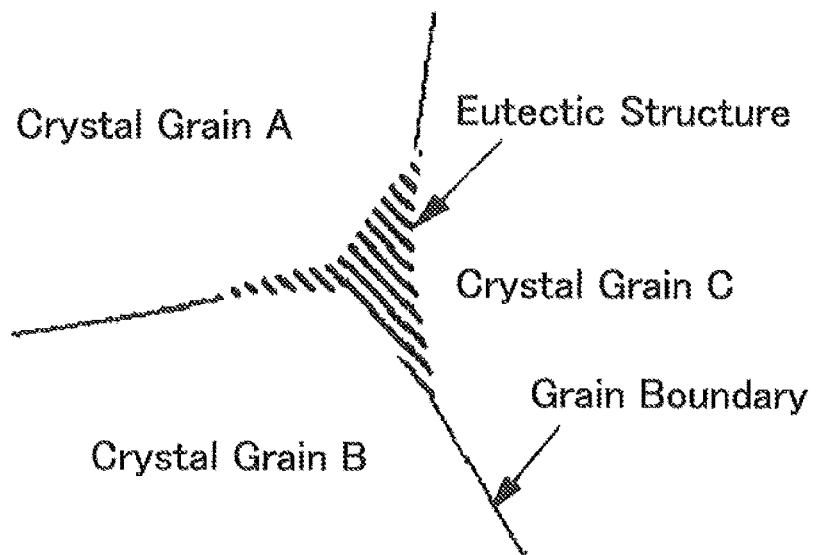
FIG. 6 is a diagram illustrating grain boundaries and a triple point thereof.
Figure 7:
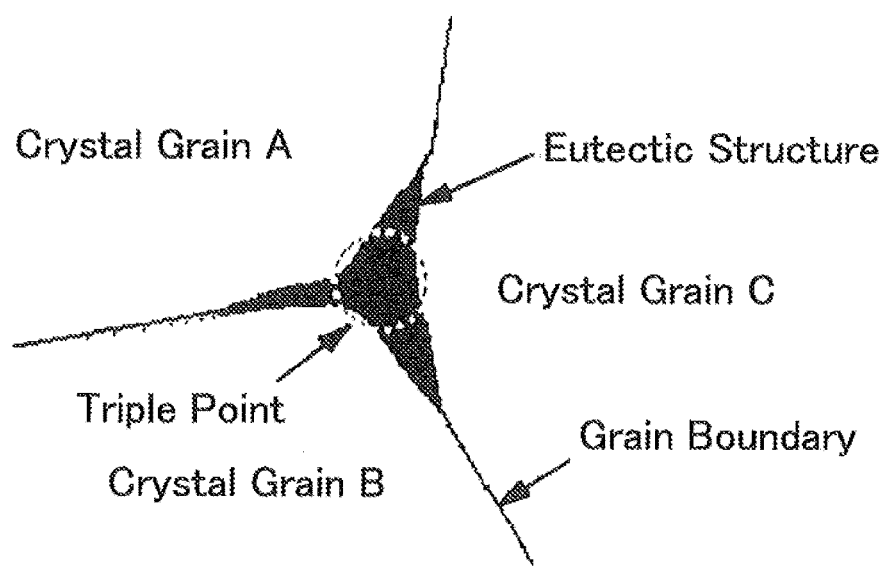
FIG. 7 is an explanatory view illustrating a method for discriminating the triple point of the grain boundaries.

The above-mentioned billets were hot-rolled as sample materials by direct extrusion, and extruded tubes having flattened shape were fabricated as samples No. D1-D24, D43 and D44 listed in Table 8. FIG. 5 is a perspective view illustrating a part of the extruded tube having the flattened shape. The arithmetic mean waviness Wa of the sample material was about 1 μm. Extrudability of the sample material in the hot extrusion was evaluated. The extrudability was evaluated to be ○ when the sound extruded member was obtained in a length of 10 m or more by the hot rolling, Δ when the sound extruded member was obtained in a length of more than 0 m and less than 10 m, and x when the sound extruded member was not obtained due to, e.g., the occur-

TABLE 6

| | Sample No. | Material No. | Composition No. | (d) | (e) | Bonding Conditions | | | | | | | Bonding Rate (%) | Deformation Rate |
|---|---|---|---|---|---|---|---|---|---|---|---|---|---|---|
| | | | | | | Temp. (° C.) | (f) | Holding Time (T) | (j) | (k) | (g) | (h) | | |
| (a) | C61 | B2 | A5 | 1.7E+04 | 4.8E+03 | 580 | 18 | 180 | 577 | 200 | 2.0E+03 | 78 | 97 | ⊚ |
| | C62 | B2 | A5 | 1.7E+04 | 4.8E+03 | 600 | 27 | 180 | 577 | 330 | 1.4E+03 | 86 | 100 | ○ |
| | C63 | B7 | A11 | 1.2E+04 | 2.7E+04 | 600 | 9 | 180 | 590 | 245 | 7.2E+01 | 68 | 91 | ⊚ |
| | C64 | B7 | A11 | 1.2E+04 | 2.7E+04 | 620 | 30 | 180 | 590 | 375 | 2.2E+01 | 86 | 100 | ○ |
| | C65 | B30 | A47 | 1.3E+04 | 2.4E+04 | 580 | 9 | 180 | 572 | 232 | 2.0E+02 | 69 | 91 | ⊚ |
| | C66 | B30 | A47 | 1.3E+04 | 2.4E+04 | 600 | 17 | 180 | 572 | 362 | 1.1E+02 | 75 | 95 | ⊚ |
| | C67 | B51 | A64 | 9.3E+03 | 1.9E+04 | 580 | 8 | 180 | 576 | 206 | 4.6E+01 | 63 | 81 | ⊚ |
| | C68 | B51 | A64 | 9.3E+03 | 1.9E+04 | 600 | 16 | 180 | 576 | 336 | 2.3E+01 | 72 | 93 | ⊚ |
| | C69 | B51 | A64 | 9.3E+03 | 1.9E+04 | 620 | 34 | 180 | 576 | 466 | 1.1E+01 | 87 | 100 | Δ |
| | C70 | B2 | A5 | 1.7E+04 | 4.8E+03 | 580 | 18 | 20 | 577 | 40 | 2.8E+03 | 57 | 84 | ⊚ |
| | C71 | B2 | A5 | 1.7E+04 | 4.8E+03 | 600 | 27 | 3300 | 577 | 3450 | 4.0E+02 | 100 | 100 | Δ |
| | C72 | B2 | A5 | 1.7E+04 | 4.8E+03 | 580 | 18 | 5 | 577 | 25 | 3.2E+03 | 52 | 81 | ⊚ |
| | C73 | B2 | A5 | 1.7E+04 | 4.8E+03 | 600 | 27 | 3600 | 577 | 3750 | 2.0E+02 | 100 | 100 | Δ |
| (i) | C74 | B2 | A5 | 1.7E+04 | 4.8E+03 | 620 | 46 | 180 | 577 | 460 | 8.0E+02 | 100 | 100 | X |
| | C75 | B7 | A11 | 1.2E+04 | 2.7E+04 | 580 | 3 | 180 | 590 | 115 | 2.2E+02 | 27 | 66 | ⊚ |
| | C76 | B30 | A47 | 1.3E+04 | 2.4E+04 | 620 | 36 | 180 | 572 | 492 | 5.1E+01 | 91 | 100 | X |

(a) Inventive Example
(i) Comparative Example
(d) Surface Density of Si-based Intermetallic Compounds (number/mm$^2$)
(e) Surface Density of Al-based Intermetallic Compounds (number/mm$^2$)
(f) Equilibrium Liquid Phase Rate (%)
(j) Temperature at which Liquid Phase Rate is 5%
(k) Time during which Liquid Phase Rate is 5% or more
(g) Surface Density of Eutectic Structures (number/mm$^2$)
(h) Rate of Triple Points of Grain boundaries where Intermetallic Compounds Exist (%)
E+ in Table indicates exponential notation. For example, 1.3+04 implies $1.3 \times 10^4$.

As seen from Table 6, in any of Inventive Examples C61-73, the conditions specified in the present invention were all satisfied, and the bonding rate and the deformation rate were both acceptable.

On the other hand, in Comparative Examples C74 and C76, because the liquid phase rate was too high, the shape could not be maintained and the deformation rate was rence of coarse intermetallic compounds during the casting (including the case where the length of the obtained sound extruded member was 0 m).

In samples No. D25-D39 listed in Table 9, the layer containing Zn as a main component was formed on the surface of the extruded tube. Samples Nos. D40-D42 listed in Table 9 represent Reference Examples in which the layer containing Zn as a main component was not formed. The Zn layer was formed by any of methods of spraying Zn, applying Zn-replaced Zn, coating Zn powder, and plating Zn.

Next, a material (arithmetic mean waviness Wa of 0.3 μm and plate thickness of 0.07 mm) having a composition F1 (JISA3003+1.5 Zn) in Table 7 was processed into a fin member. The fin member was formed into a corrugated shape having a height of 7 mm.

The three-stage laminated test piece (mini-core), illustrated in FIG. 4, was fabricated by combining the flattened extruded tubes corresponding to each of the samples Nos. D1-D42, D43 and D44 with the above-mentioned fin members, and assembling them with the aid of the stainless jig. In the case of the mini-core thus obtained, because of the difference in coefficient of thermal expansion between the stainless jig and the aluminum material, a compression load of about 4N was generated between the stainless jig and the mini-core during the heating for the bonding. This implies that, with calculation based on a bonding area, stress of about 10 kPa is generated at the bonding interface between the fin and the tube.

The mini-core fabricated as described above was dipped in a suspension solution containing 10% of non-corrosive fluoride-based flux. After drying, the mini-core was heated for 3 minutes at 580 to 600° C. in a nitrogen atmosphere, thereby bonding the fin and tube members to each other. In the sample Nos. D13, D14 and D22, the fin and tube members were bonded in vacuum without applying the flux. In the sample No. D12, fluoride-based flux containing cesium was used. In the sample No. D26, the Zn-replaced flux was applied and the heating was then performed.

For the samples No. D1-D24, D43 and D44, the bonding rate between the fin and the tube was determined and evaluated in the same way as in the first embodiment. The occurrence of tube collapse was also confirmed. Furthermore, for evaluation of corrosion resistance, the CASS test was conducted for 1000 h, and the occurrence of corrosion penetrating through the tube was confirmed. The evaluation result was determined to be ◯ when the corrosion did not occur, and x when the corrosion occurred.

Moreover, as in the first embodiment, the structure in a cross-section of each member was observed to determine the surface density of the eutectic structures having lengths of 3 μm or more within the grains, and the rate of the triple points of the grain boundaries where the intermetallic compounds having the equivalent circle diameters of 1 μm or more existed with respect to the triple points of all the grain boundaries. In addition, as in the first embodiment, the surface density of dispersed particles of the Si-based intermetallic compounds and the Al-based intermetallic compounds, having equivalent circle diameters of 0.5 μm to 5 μm, in the sample was measured. The measurement results are listed in Table 8.

For the samples No. D25-D42, the extruded tube was peeled off from the fin, and the depth of the corrosion occurred in the extruded tube, including on its surface the layer containing Zn as a main component, was measured by the focal depth method. The measurement results are listed in Table 9.

TABLE 7

| Composition No. | Si | Fe | Mn | Zn | Sb | In | Mg | Cu | Cr | Ti | V | Al |
|---|---|---|---|---|---|---|---|---|---|---|---|---|
| E1 | 1.3 | 0.05 | — | — | — | — | — | — | — | — | — | balance |
| E2 | 2.0 | 0.05 | — | — | — | — | — | — | — | — | — | balance |
| E3 | 2.5 | 0.05 | — | — | — | — | — | — | — | — | — | balance |
| E4 | 3.5 | 0.05 | — | — | — | — | — | — | — | — | — | balance |
| E5 | 5.0 | 0.05 | — | — | — | — | — | — | — | — | — | balance |
| E6 | 3.5 | 1.00 | — | 0.3 | — | — | — | — | — | — | — | balance |
| E7 | 2.5 | 0.10 | 0.5 | — | — | — | — | — | — | — | — | balance |
| E8 | 2.0 | 0.60 | 1.0 | — | — | — | — | — | 0.10 | — | — | balance |
| E9 | 2.5 | 0.05 | 1.8 | — | — | — | — | 0.3 | — | — | — | balance |
| E10 | 1.5 | 0.25 | — | 0.1 | — | — | 0.1 | 0.3 | — | — | — | balance |
| E11 | 2.5 | 0.25 | — | — | — | — | 0.5 | 0.1 | — | — | — | balance |
| E12 | 2.5 | 0.25 | — | 0.1 | — | — | — | 0.8 | — | — | — | balance |
| E13 | 2.5 | 0.25 | — | — | — | — | 1.0 | — | — | 0.10 | — | balance |
| E14 | 2.0 | 0.10 | — | — | — | — | 2.0 | — | — | — | — | balance |
| E15 | 2.5 | 0.25 | 0.3 | 0.8 | — | — | — | — | — | — | 0.10 | balance |
| E16 | 0.8 | 0.05 | — | — | — | — | — | — | — | — | — | balance |
| E17 | 5.2 | 0.05 | — | — | — | — | — | — | — | — | — | balance |
| E18 | 0.8 | 0.60 | — | — | — | — | 0.3 | — | — | — | — | balance |
| E19 | 5.2 | 0.25 | 0.5 | — | — | — | — | — | — | — | — | balance |
| E20 | 2.5 | 2.10 | — | — | — | — | — | 1.6 | — | — | — | balance |
| E21 | 3.5 | 0.05 | 2.2 | — | — | — | — | — | — | — | — | balance |
| E22 | 2.5 | 0.25 | — | 7.0 | — | — | — | — | — | — | — | balance |
| E23 | 2.5 | 0.25 | 0.5 | — | — | — | 2.1 | — | — | — | — | balance |
| E24 | 2.5 | 0.25 | — | — | — | — | — | — | 0.33 | 0.33 | 0.33 | balance |
| E25 | 2.5 | 0.25 | — | — | 0.15 | — | — | — | — | — | — | balance |
| E26 | 2.5 | 0.25 | — | — | — | 0.15 | — | — | — | — | — | balance |
| F1 | 0.5 | 0.30 | 1.0 | 1.50 | — | — | — | 0.15 | — | — | — | balance |

TABLE 8

| | No. | (d) | Extrudability | (d) | (e) | Bonding Temp. (° C.) | (g) | (h) | Bonding Rate (%) | Tube Collapse | Corrosion Resistance CASS |
|---|---|---|---|---|---|---|---|---|---|---|---|
| (a) | D1 | E1 | ○ | 9.4E+03 | 4.8E+03 | 600 | 1.1E+04 | 50 | 79.7 | no | ○ |
| | D2 | E2 | ○ | 1.2E+04 | 4.8E+03 | 600 | 3.3E+03 | 71 | 92.4 | no | ○ |
| | D3 | E3 | ○ | 1.4E+04 | 4.8E+03 | 600 | 2.2E+03 | 77 | 96.1 | no | ○ |
| | D4 | E4 | ○ | 1.8E+04 | 4.8E+03 | 600 | 1.3E+03 | 89 | 100.0 | no | ○ |
| | D5 | E5 | Δ | 2.2E+04 | 4.8E+03 | 580 | 1.1E+03 | 94 | 100.0 | no | ○ |
| | D6 | E6 | ○ | 1.7E+04 | 2.1E+04 | 600 | 1.4E+02 | 88 | 100.0 | no | ○ |
| | D7 | E7 | ○ | 1.4E+04 | 1.6E+04 | 600 | 6.5E+02 | 76 | 95.4 | no | ○ |
| | D8 | E8 | ○ | 8.1E+03 | 2.6E+04 | 600 | 1.5E+02 | 64 | 88.2 | no | ○ |
| | D9 | E9 | Δ | 1.2E+04 | 2.8E+04 | 600 | 4.3E+01 | 72 | 93.4 | no | ○ |
| | D10 | E10 | ○ | 1.0E+04 | 1.0E+04 | 600 | 3.3E+03 | 63 | 88.0 | no | ○ |
| | D11 | E11 | ○ | 1.4E+04 | 1.0E+04 | 600 | 1.1E+03 | 81 | 98.5 | no | ○ |
| | D12 | E12 | ○ | 1.4E+04 | 1.0E+04 | 600 | 1.1E+03 | 81 | 98.5 | no | ○ |
| | D13 | E13 | ○ | 1.4E+04 | 1.0E+04 | 600 | 9.6E+02 | 83 | 99.5 | no | ○ |
| | D14 | E14 | Δ | 1.2E+04 | 6.7E+03 | 600 | 1.4E+03 | 81 | 98.4 | no | ○ |
| | D15 | E15 | ○ | 1.4E+04 | 1.5E+04 | 600 | 6.4E+02 | 77 | 96.4 | no | ○ |
| | D43 | E25 | ○ | 1.4E+04 | 1.0E+04 | 600 | 1.4E+03 | 76 | 97.4 | no | ○ |
| | D44 | E26 | ○ | 1.4E+04 | 1.0E+04 | 600 | 1.4E+03 | 76 | 98.5 | no | ○ |
| (i) | D16 | E16 | ○ | 6.9E+03 | 4.8E+03 | 620 | 1.2E+04 | 47 | 78.4 | no | ○ |
| | D17 | E17 | Δ | 2.3E+04 | 4.8E+03 | 580 | 1.0E+03 | 95 | 100.0 | yes | ○ |
| | D18 | E18 | ○ | 5.9E+03 | 1.6E+04 | 620 | 3.4E+03 | 46 | 77.7 | no | ○ |
| | D19 | E19 | X | 2.2E+04 | 1.8E+04 | 580 | 2.2E+03 | 94 | 100.0 | yes | ○ |
| | D20 | E20 | Δ | 1.2E+04 | 3.0E+04 | 600 | 1.7E+01 | 77 | 96.3 | no | X |
| | D21 | E21 | Δ | 1.6E+04 | 3.1E+04 | 600 | 1.1E+01 | 82 | 98.9 | no | X |
| | D22 | E22 | ○ | 1.4E+04 | 1.0E+04 | 600 | 7.0E+02 | 90 | 100.0 | no | X |
| | D23 | E23 | Δ | 1.4E+04 | 1.8E+04 | 600 | 2.5E+02 | 87 | 100.0 | no | X |
| | D24 | E24 | Δ | 1.4E+04 | 1.0E+04 | 600 | 1.4E+03 | 76 | 95.5 | no | X |

(a) Inventive Example
(i) Comparative Example
(d) Surface Density of Si-based Intermetallic Compounds (number/mm$^2$)
(e) Surface Density of Al-based Intermetallic Compounds (number/mm$^2$)
(g) Surface Density of Eutectic Structures (number/mm$^2$)
(h) Rate of Triple Points of Grain boundaries where Intermetallic Compounds Exist (%)
E+ in Table indicates exponential notation. For example, 1.3+04 implies $1.3 \times 10^4$.

TABLE 9

| | Sample No. | Composition No. | Layer Containing Zn as Main Component | | | Bonding Temperature (° C.) | Corrosion Depth (mm) |
|---|---|---|---|---|---|---|---|
| | | | Forming Method | Amount of Zn Deposited (g/m$^2$) | Fin | | |
| (a) | D25 | E1 | Zn spray | 8 | F1 | 600 | 0.04 |
| | D26 | E2 | (1) | 8 | F1 | 600 | 0.04 |
| | D27 | E3 | Coat Zn powder | 8 | F1 | 600 | 0.04 |
| | D28 | E4 | Zn plating | 8 | F1 | 600 | 0.04 |
| | D29 | E5 | Zn spray | 1 | F1 | 580 | 0.35 |
| | D30 | E6 | Zn spray | 30 | F1 | 600 | 0.26 |
| | D31 | E7 | Zn spray | 5 | F1 | 600 | 0.08 |
| | D32 | E8 | Zn spray | 20 | F1 | 600 | 0.11 |
| | D33 | E9 | Zn spray | 15 | F1 | 600 | 0.06 |
| | D34 | E10 | Zn spray | 10 | F1 | 600 | 0.05 |
| | D35 | E11 | Zn spray | 11 | F1 | 600 | 0.05 |
| | D36 | E12 | Zn spray | 25 | F1 | 600 | 0.18 |
| | D37 | E13 | Zn spray | 0.5 | F1 | 600 | 0.56 |
| | D38 | E14 | Zn spray | 35 | F1 | 600 | 0.51 |
| | D39 | E15 | Zn spray | 8 | none | 600 | 0.12 |
| (i) | D40 | E3 | none | — | F1 | 600 | 1.21 |
| | D41 | E7 | none | — | F1 | 600 | 0.97 |
| | D42 | E12 | none | — | F1 | 600 | 1.65 |

(a) Inventive Example
(i) Comparative Example
(1) Apply Zn-replaced flux

As seen from Table 8, in any of Inventive Examples D1-D15, D43 and D44, the extrudability, the bonding rate, the tube collapse, and the corrosion resistance were all acceptable.

On the other hand, in Comparative Example D16 (alloy composition E16), because the Si component did not reach the specified value, the rate of the triple points of the grain boundaries where the intermetallic compounds having the equivalent circle diameters of 1 μm or more existed with respect to the triple points of all the grain boundaries was low. The bonding rate was also low.

In Comparative Example D17 (alloy composition E17), because the Si component exceeded the specified value and the liquid phase rate was too high, the extruded tube was collapsed during the bonding.

In Comparative Example D18 (alloy composition E18), because the Si component did not reach the specified value, the rate of the triple points of the grain boundaries where the intermetallic compounds having the equivalent circle diameters of 1 μm or more existed was low. The bonding rare was also reduced.

In Comparative Example D19 (alloy composition E19), because the Si component exceeded the specified value, the extruded tube was collapsed during the bonding.

In Comparative Examples D20-D24, the penetrating holes were generated in the results of the CASS tests, and the corrosion resistance was inferior. Those results were attributable to the alloy compositions. More specifically, in Comparative Examples D20-D24, the Fe and Cu components (alloy composition E20), the Mn component (alloy composition E21), the Zn component (alloy composition E22), the Mg component (alloy composition E23), and the Cr, Ti and V components (alloy composition E24) exceeded the respective specified values.

Regarding the effect of the layer containing Zn as a main component, as seen from Table 9, in Inventive Examples D25-D39, the sacrificial anticorrosion effect was developed with the Zn layer formed on the surface, and the corrosion depth was as small as 0.60 mm or less.

On the other hand, in Reference Examples D40-D42, because Zn was not applied to the surface, the corrosion depth was as large as in excess of 0.90 mm though not penetrating. Thus, the effect obtained by forming the layer containing Zn as a main component to improve the corrosion resistance was confirmed.

INDUSTRIAL APPLICABILITY

According to the present invention, since the aluminum alloy material can be bonded without using a bonding material, such as a brazing filler metal or a filler metal, a structure using the aluminum alloy material can be efficiently manufactured. Furthermore, in the present invention, change in size or shape hardly occurs between before and after bonding of bonded members. Thus, the aluminum alloy material, the structure using the aluminum alloy material, and the manufacturing method for the aluminum alloy material, according to the present invention, are remarkably effective from the industrial point of view.

LIST OF REFERENCE CHARACTERS c . . . Si composition
c1 . . . Si composition
c2 . . . Si composition
T . . . temperature
T1 . . . temperature higher than Te
T2 . . . temperature higher than Ts2
Te . . . solidus temperature
Ts2 . . . solidus temperature

The invention claimed is:

1. A fin member for a heat exchanger having a heat bonding ability with a single layer comprising an aluminum alloy material consisting essentially of Si: 1.0 mass % to 5.0 mass % and Fe: 0.01 mass % to 2.0 mass %, at least one of Mg: in an amount of >0 and ≤2.0 mass %, Cu: in an amount of >0 and ≤1.5 mass %, and Mn: in an amount of >0 and ≤2.0 mass %, and at least one of Ti: in an amount of >0 and ≤0.3 mass %, V: in an amount of >0 and ≤0.3 mass %, Cr: in an amount of >0 and ≤0.3 mass %, Ni: in an amount of >0 and ≤2.0 mass %, and Zr: in an amount of >0 and ≤0.3 mass %, with balance being Al and inevitable impurities, wherein the contents (mass %) of Si, Fe and Mn are denoted by S, F, and M, respectively and a relational expression of $1.2 \leq S - 0.3(F+M) \leq 3.5$ is satisfied, wherein $1.3 \times 10^3$ pcs/mm$^2$ or more to $2.2 \times 10^4$ pcs/mm$^2$ or less of Si-based intermetallic compound particles, each of which has equivalent circle diameters of 0.5 to 5 μm and is selected from Si alone and Si partly containing elements of Ca and P, are present in a cross-section of the aluminum alloy material, wherein $1.3 \times 10^3$ pcs/mm$^2$ or more to $3.3 \times 10^4$ pcs/mm$^2$ or less of dispersed particles of Al-based intermetallic compounds, each of which has equivalent circle diameters of 0.5 to 5 μm and is generated from Al and additive elements selected from Al—Fe-based, Al—Fe—Si-based, Al—Mn—Si-based, Al—Fe—Mn-based and Al—Fe—Mn—Si-based compounds, are present in a cross-section of the aluminum alloy material, wherein the aluminum alloy material is heat bonded with a single layer without the use of a brazing filler metal, and wherein the fin is bonded to a second member, wherein, in a metal structure in a cross-section of at least one of the bonded members, 10 to 3000 pcs/mm$^2$ of eutectic structures having a length of 3 μm or more are present within matrix crystal grains.

2. The fin member according to claim 1, wherein in the metal structure in the cross-section of the at least one bonded members, a number of triple points of grain boundaries where Si-based intermetallic compounds and Al-based intermetallic compounds both having equivalent circle diameters of 1 μm or more exist, is 50% or more of the number of triple points of all the grain boundaries.

* * * * *